(12) United States Patent
Oyumi

(10) Patent No.: US 7,301,677 B2
(45) Date of Patent: Nov. 27, 2007

(54) IMAGE FORMING SYSTEM, IMAGE DISTRIBUTION APPARATUS, AND IMAGE FORMING METHOD

(75) Inventor: Masashi Oyumi, Chiba (JP)

(73) Assignee: Canon Kabushiki Kaisha (JP)

( * ) Notice: Subject to any disclaimer, the term of this patent is extended or adjusted under 35 U.S.C. 154(b) by 1050 days.

(21) Appl. No.: 10/616,469

(22) Filed: Jul. 9, 2003

(65) Prior Publication Data

US 2004/0066535 A1 Apr. 8, 2004

(30) Foreign Application Priority Data

Jul. 17, 2002 (JP) ............................. 2002-208087

(51) Int. Cl.
*G06K 15/00* (2006.01)
(52) U.S. Cl. .................... 358/3.28; 358/1.9; 358/1.6
(58) Field of Classification Search ................. 358/1.6, 358/1.9, 3.28, 1.13, 1.15, 1.18
See application file for complete search history.

(56) References Cited

U.S. PATENT DOCUMENTS 5,583,978 A * 12/1996 Collins et al. .............. 345/170
6,031,631 A * 2/2000 Tahara et al. ............... 358/296
6,330,051 B1 * 12/2001 Takanashi .................... 355/40
2003/0189730 A1 * 10/2003 Enomoto .................... 358/3.26

FOREIGN PATENT DOCUMENTS

| JP | 07-038696 | 2/1995 |
| JP | 09-027879 | 1/1997 |
| JP | 2001-083848 | 3/2001 |

* cited by examiner

*Primary Examiner*—Jerome Grant, II
(74) *Attorney, Agent, or Firm*—Rossi, Kimms & McDowell LLP

(57) ABSTRACT

There is provided an image forming system that is capable of making uniform in size printed images, which should originally be the same in size, between transfer sheets on which the images have been printed by a plurality of printers having different functions and capabilities when enough time has elapsed after fixing. In each of the printers, an image controller or the like forms predetermined marks on a transfer material, and a fixing device thermally fixes of the predetermined marks formed on the transfer material, and a mark detecting device or the like detects the predetermined marks. A host server connected to the printers via a network adjusts the sizes of images to be formed by the respective printers according to the predetermined marks detected by the respective printers, and then transfers the image data to the printers. Each of the printers performs image formation based on the transferred image data.

21 Claims, 14 Drawing Sheets

PC : PATTERN CENTRAL POSITION

PI : PATTERN IMAGE

VD : SUB-SCANNING DIRECTION (Y) HISTOGRAM DATA (INTEGRATION)

HD : MAIN SCANNING DIRECTION (X) HISTOGRAM DATA (INTEGRATION)

IMAGE FORMING SYSTEM, IMAGE DISTRIBUTION APPARATUS, AND IMAGE FORMING METHOD

BACKGROUND OF THE INVENTION

1. Field of the Invention

The present invention relates to an image forming system, an image distribution apparatus, and an image forming method. In particular, the present invention relates to an image forming system comprised of a plurality of image forming apparatuses and an image distributing apparatus that distributes image data to the plurality of image forming apparatuses, an image distribution apparatus to which a plurality of image forming apparatuses are connected and which distributes image data to the plurality of image forming apparatuses, and an image forming method applied to the image forming system.

2. Description of the Related Art

Conventionally, to melt a developing agent (toner) in a thermally fixing process in xerography, a transfer sheet with toner adhered thereto is passed between fixing rollers which are controlled to have a high temperature of about 160 to 200° C. In the case where a normal transfer sheet is used, the transfer sheet itself shrinks slightly in the fixing process due to evaporation of moisture absorbed in the transfer sheet or for other reasons. The transfer sheet returns to its approximately original size if the temperature of the transfer sheet is lowered to the ambient temperature and the transfer sheet absorbs moisture in the air.

However, in double-sided printing in which the second side of a transfer sheet is printed immediately after the first side thereof is printed, an image is printed on the second side in a state in which the transfer sheet has been reduced in size immediately after toner is thermally fixed on the first side. For this reason, when the transfer sheet has returned to its original size, the size of an image printed on the second side is greater than that of the image just printed on the second side by an amount corresponding to the shrinkage amount of the transfer sheet. To solve this problem, an image forming apparatus has been proposed which detects the shrinkage amount of a transfer sheet immediately after fixing, and performs printing after reducing the size of an image to be printed on the second size according to the detection result, so that when the transfer sheet has returned to its original size, the size of an image printed on the second size can be equal to its original size, i.e., when the transfer sheet has returned to its original size in the case where images, which should originally be the same in size, are printed on the first side and second sides, the sizes of the printed images can be equal.

In a conventional large-sized printer system to which a wide variety of printers having different functions and capabilities are connected, the respective printers are caused to form desired images on transfer sheets, and the transfer sheets on which the images have been formed are bound up.

However, the plurality of printers constituting the above conventional printer system differ in amount of heat applied to a transfer sheet during fixing according to print methods such as full-color/black-and-white and print speed, and thus differ in shrinkage amount of a transfer sheet during fixing. Therefore, in double-sided printing, if images to be printed on the second sides by the respective printers are reduced by the same amount, the sizes of some images printed on the second sides may be different from the original sizes. It should be noted that some transfer sheets may not perfectly return to their original sizes even though the transfer sheets absorbs moisture in the air after fixing, and the degree to which a transfer sheet returns to its original size depends on the shrinkage amount of the transfer sheet during fixing. Therefore, in either double-sided printing or one-sided printing, images printed on respective transfer sheets by the plurality of printers may be different in size when enough time has elapsed after fixing although the images should originally be the same in size.

Under these circumstances, when transfer sheets printed by respective printers having different functions and capabilities are bound up, there is the problem that images printed on the transfer sheets are different in size although they should originally be the same in size.

SUMMARY OF THE INVENTION

It is therefore an object of the present invention to provide an image forming system, an image distribution apparatus, and an image forming method that are capable of making uniform in size printed images, which should originally be the same in size, between transfer sheets on which the images have been printed by a plurality of printers having different functions and capabilities when enough time has elapsed after fixing.

To attain the above object, in a first aspect of the present invention, there is provided an image forming system comprising a plurality of image forming apparatuses, a distributing apparatus that distributes image data to the plurality of image forming apparatuses, a mark forming device provided in each of the plurality of image forming apparatuses, for forming at least one predetermined mark on a transfer material, a fixing device provided in each of the plurality of image forming apparatuses, for thermally fixing a toner image formed on the transfer material, a detecting device provided in each of the plurality of image forming apparatuses, for detecting the predetermined mark formed on the transfer material, and a transfer device provided in the distributing apparatus, for adjusting sizes of images to be formed by respective ones of the plurality of image forming apparatuses according to the predetermined mark detected by the respective ones of the plurality of image forming apparatuses, and for transferring the images to the respective ones of the plurality of image forming apparatuses.

Preferably, the image forming system comprises a reduction ratio calculating device that calculates reduction ratios of transfer materials used by respective ones of the plurality of image forming apparatuses according to the predetermined mark detected by the respective ones of the plurality of image forming apparatuses, and the transfer device selects a minimum value among the reduction ratios calculated by the reduction ratio calculating device and corresponding to the respective ones of the plurality of image forming apparatuses, and adjusts sizes of images to be formed by the respective ones of the plurality of image forming apparatuses according to the selected minimum value.

More preferably, the reduction ratio calculating device is provided in each of the plurality of image forming apparatuses.

Alternatively, preferably, the reduction ratio calculating device is provided in the distributing apparatus.

Also preferably, the detecting device detects the predetermined mark formed on the transfer material at least after a temperature of the transfer material becomes equal to an ambient temperature after the fixing device thermally fixes the toner image of the predetermined mark formed on the transfer material.

Preferably, the transfer device adjusts the sizes of images to be formed by the respective ones of the plurality of image forming apparatuses according to the predetermined mark detected by the respective ones of the plurality of image forming apparatuses and an order in which the predetermined mark is formed in a case where the predetermined mark is formed on both sides of the transfer material.

Preferably, the mark forming device forms a plurality of predetermined marks as the predetermined mark on the transfer material in a manner being arranged in a main scanning direction thereof, and detects the plurality of predetermined marks at a time.

Preferably, the mark forming device forms a plurality of predetermined marks as the predetermined mark on the transfer material in a manner being arranged in a sub-scanning direction thereof, and detects the plurality of predetermined marks at different times.

Preferably, the distributing apparatus is included one of the plurality of image forming apparatuses.

To attain the above object, in a second aspect of the present invention, there is provided an image distribution apparatus for distributing image data to a plurality of image forming apparatuses connected to the image distribution apparatus, the image forming apparatuses each comprising a mark forming device that forms at least one predetermined mark on a transfer material, a fixing device that thermally fixes a toner image formed on the transfer material, and a detecting device that detects the predetermined mark formed on the transfer material, the image distribution apparatus comprising a transfer device that adjusts sizes of images to be formed by respective ones of the plurality of image forming apparatuses according to the predetermined mark detected by the detecting devices of the respective ones of the plurality of image forming apparatuses, and transfers the images to the respective ones of the plurality of image forming apparatuses.

Preferably, the image distribution apparatus comprises a reduction ratio calculating device that calculates reduction ratios of transfer materials to be used by respective ones of the plurality of image forming apparatuses according to the predetermined mark detected by the respective ones of the plurality of image forming apparatuses, and the transfer device selects a minimum value among the reduction ratios calculated by the reduction ratio calculating device and corresponding to the respective ones of the image forming apparatuses, and adjusts sizes of images to be formed by the respective ones of the plurality of image forming apparatuses according to the selected minimum value.

Preferably, the transfer device adjusts the sizes of images to be formed by the respective ones of the plurality of image forming apparatuses according to the predetermined mark detected by respective ones of the plurality of image forming apparatuses, and an order in which the predetermined mark is formed in a case where the predetermined mark is formed on both sides of the transfer material.

Preferably, the image distribution apparatus is included in one of the plurality of image forming apparatuses.

To attain the above object, in a third aspect of the present invention, there is provided an image forming method executed by an image forming system comprising a plurality of image forming apparatuses and a distributing apparatus that distributes image data to the plurality of image forming apparatuses, comprising the steps of a mark forming step of causing each of the plurality of image forming apparatuses to form at least one predetermined mark on a transfer material, a fixing step of causing each of the plurality of image forming apparatuses to thermally fix a toner image formed on the transfer material, a detecting step of causing each of the plurality of image forming apparatuses to detect the predetermined mark formed and thermally fixed on the transfer material, and a transfer step of causing the distributing apparatus to adjust sizes of images to be formed by respective ones of the plurality of image forming apparatuses according to the predetermined mark detected by the respective ones of the plurality of image forming apparatuses, and transfer the images to the plurality of image forming apparatuses.

Preferably, the image forming method comprises a reduction ratio calculating step of calculating reduction ratios of transfer materials used by respective ones of the plurality of image forming apparatuses according to the predetermined mark detected by the respective ones of the plurality of image forming apparatuses, and the transfer step comprises selecting a minimum value among the calculated reduction ratios and corresponding to the respective ones of the plurality of image forming apparatuses in the reduction ratio calculating step, and adjusting sizes of images to be formed by respective ones of the plurality of image forming apparatuses according to the selected minimum value.

More preferably, the reduction ratio calculating step is executed by each of the plurality of image forming apparatuses.

Alternatively, preferably, the reduction ratio calculating step is executed by the distributing apparatus.

Also preferably, the detecting step comprises detecting the predetermined mark formed on the transfer material at least after a temperature of the transfer material becomes equal to an ambient temperature after the toner image of the predetermined mark formed on the transfer material is thermally fixed in the fixing step.

Preferably, the transfer step comprises adjusting the sizes of images to be formed by the respective ones of the plurality of image forming apparatuses according to the predetermined mark detected by respective ones of the plurality of image forming apparatuses and an order in which the predetermined mark is formed in a case where the predetermined mark is formed on both sides of the transfer material.

Preferably, the mark forming step comprises forming a plurality of predetermined marks as the predetermined mark on the transfer material in a manner being arranged in a main scanning direction thereof, and the detecting step comprises detecting the plurality of predetermined marks at a time.

Preferably, the mark forming step comprises forming a plurality of predetermined marks as the predetermined mark on the transfer material in a manner being arranged in a sub-scanning direction thereof, and the detecting step comprises detecting the plurality of predetermined marks at different times.

As described above, with the arrangement according to the first through third aspects of the present invention, it is possible to make uniform in size printed images, which should originally be the same in size, between transfer materials on which the images have been printed by a plurality of image forming apparatuses having different functions and capabilities when enough time has elapsed after a fixing process. As a result, it is possible to realize high-quality finish, for example, in the case where transfer materials outputted from respective image forming apparatuses are bound up.

In particular, since the reduction ratios of transfer materials outputted from a plurality of image forming apparatuses are calculated according to predetermined marks detected by the plurality of image forming apparatuses, and the sizes of images to be formed by the respective image forming apparatuses are adjusted according to the minimum value of the reduction ratios, the sizes of image formed by the respective image forming apparatuses can be made equal to the size of an image formed by one of the image forming apparatuses whose transfer material reduction ratio is highest.

Alternatively, since the sizes of images to be formed by the respective image forming apparatuses are adjusted according to the order in which detected predetermined marks are formed in a case where the predetermined marks are formed on both sides of each transfer material, the sizes of images, which should originally be equal, can be made uniform in double-sided printing performed by the respective image forming apparatuses.

Further, since a plurality of predetermined marks are formed on a transfer material in a manner being arranged in the main scanning direction thereof, and the reduction ratio of the transfer material in the main scanning direction thereof is determined according to the predetermined marks, it is possible to make uniform the sizes of images outputted from respective image forming apparatuses.

Further, since a plurality of predetermined marks are formed on a transfer material in a manner being arranged in the sub-scanning direction thereof, and the reduction ratio of the transfer material in the sub-scanning direction thereof is determined according to the predetermined marks, it is possible to make uniform the sizes of images outputted from respective image forming apparatuses.

The above and other objects, features, and advantages of the invention will become more apparent from the following detailed description taken in conjunction with the accompanying drawings.

BRIEF DESCRIPTION OF THE DRAWINGS

FIGS. 8A and 8B are timing charts showing how the detection controller in FIG. 5 operates, in which:

FIG. 8A shows operation of the detection controller for approximately one line in the main scanning direction; and FIG. 8B shows operation of the detection controller for multiple lines in the main scanning direction;

DETAILED DESCRIPTION OF THE PREFERRED EMBODIMENTS

Figure 1:
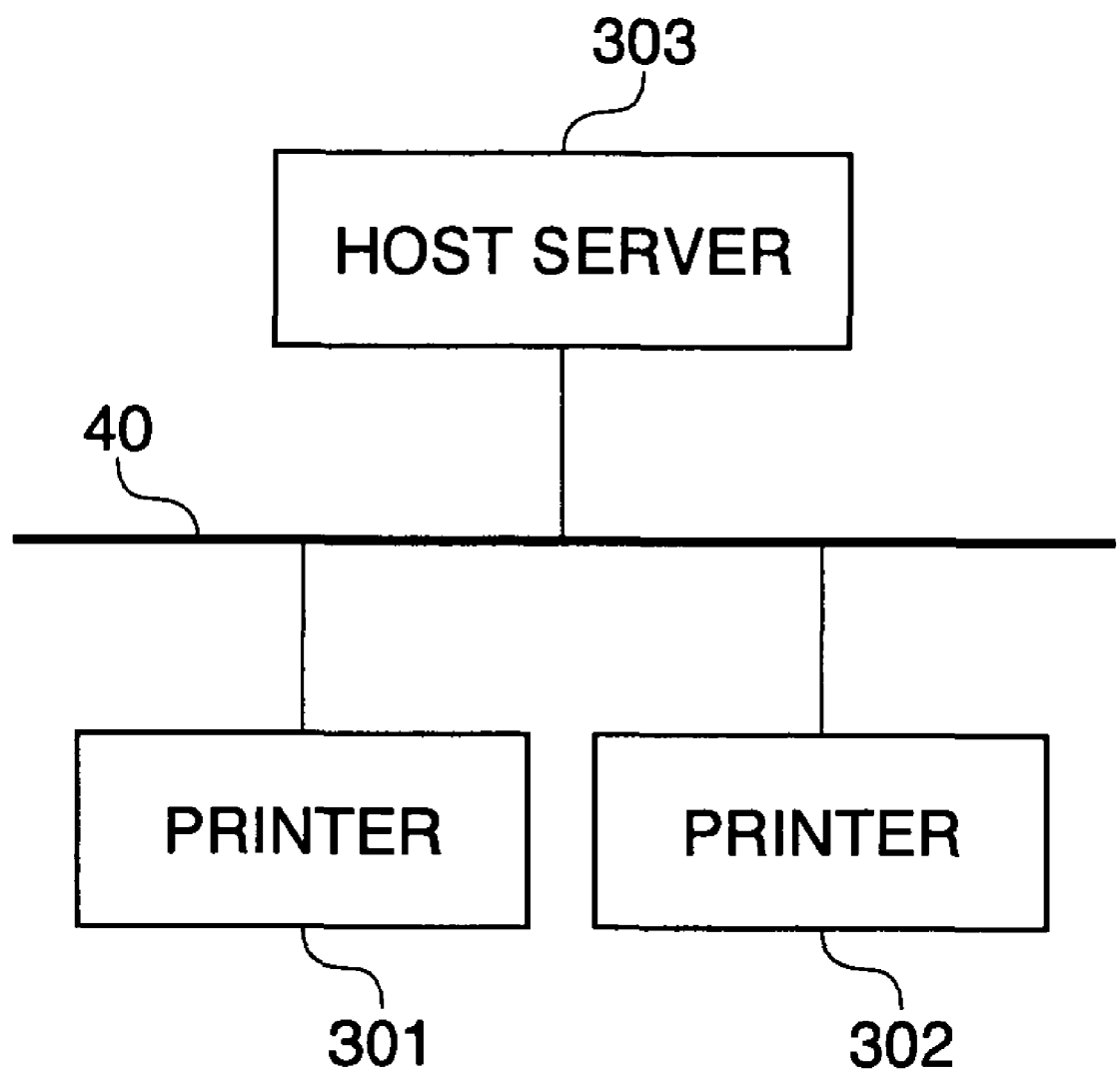
FIG. 1 is a block diagram showing the arrangement of an image forming system according to a first embodiment of the present invention.

The present invention will now be described in detail below with reference to the accompanying drawings showing preferred embodiments thereof. In the drawings, elements and parts which are identical throughout the views are designated by identical reference numerals, and duplicate description thereof is omitted.

FIG. 1 is a block diagram showing the arrangement of an image forming system according to a first embodiment of the present invention. In FIG. 1, reference numerals 301 and 302 each denote a printer; 40, a network; and 303, a host server that controls the operation of the printers 301 and 302. Although only the two printers 301 and 302 are illustrated, three or more printers may be connected to the network 40. Each printer may perform either black-and-white printing or color printing, and may perform either one-sided printing or double-sided printing.

The host server 303 communicates with the printers 301 and 302 via the network 40, controls the operation of the printers 301 and 302, distributes images to the printers 301 and 302, and performs image processing.

Figure 2:
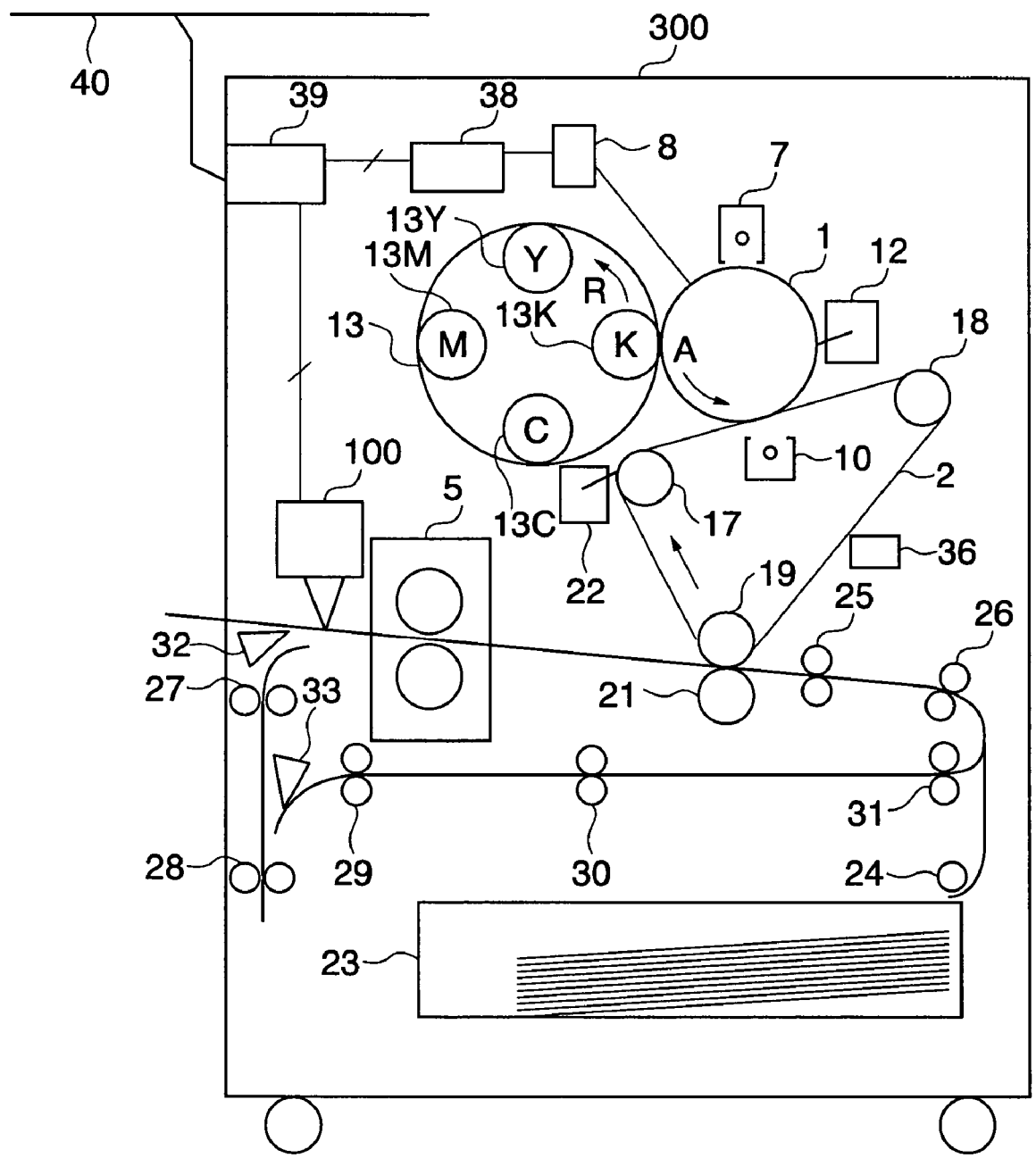
FIG. 2 is a sectional view schematically showing the construction of one of printers appearing in FIG. 1.

FIG. 2 is a sectional view schematically showing an example of the construction of one of the printers 301 and 302. Here, an image forming apparatus capable of performing full-color printing and double-sided printing is taken for instance. It is assumed that the other printer is substantially identical in construction and function with the illustrated printer. The image forming apparatus 300 is provided with a photosensitive drum (hereinafter referred to as "the photosensitive body") 1 as an image carrier. The photosensitive body 1 is rotated in the direction of an arrow A by a motor, not shown. A primary electrifier 7, an exposure device 8, a developing unit 13, a transfer device 10, and a cleaner 12 are arranged around the photosensitive body 1.

The developing unit 13 is comprised of four developing devices 13Y, 13M, 13C, and 13K, which are intended for full-color development. The developing devices 13Y, 13M, 13C, and 13K develop latent images on the photosensitive body 1 using yellow (Y), magenta (M), cyan (C), and black (K) toners, respectively. To develop images using toners of the respective colors, the developing unit 13 is rotated in the direction of an arrow R by a motor, not shown, to be positioned such that the developing devices corresponding to the respective colors can be sequentially abutted on the photosensitive body 1.

Toner images of the respective colors developed on the photosensitive body 1 are sequentially transferred onto a belt 2 serving as an intermediate transfer body by the transfer device 10, and the toner images of the four colors are superimposed. The belt 2 is tightly stretched between rollers 17, 18, and 19. The roller 17 is connected to a driver, not shown, to function as a driving roller that drives the belt 2; the roller 18 functions as a tension roller that controls the tension of the belt 2; and the roller 19 functions as a backup roller for a transfer roller 21 as a secondary transfer device.

At a location opposed to the roller 17 across the belt 2, a belt cleaner 22 is disposed such that it may be abutted on and separated from the belt 2. After the secondary transfer, residual toner on the belt 2 after the secondary transfer is scrapped off by a cleaner blade of the belt cleaner 22.

A recording sheet pulled out from a recording sheet cassette 23 onto a conveying path by a pickup roller 24 is fed to a nip section by pairs of rollers 25 and 26, i.e. to the abutment part of the transfer belt 21 and the belt 2. A toner image formed on the belt 2 is transferred onto the recording sheet in the nip section and thermally fixed by a fixing device 5, and then the recording sheet is discharged from the apparatus 300. In the case where images are formed on both sides of the recording sheet, a flapper 32 is operable to convey the recording sheet toward a pair of conveying rollers 27. After conveying the transfer sheet to a position beyond a flapper 33, a pair of container rollers 28 are rotated in the opposite direction, and the flapper 33 is operated to convey the recording sheet toward a pair of conveying rollers 29. Then, pairs of conveying rollers 30 and 31 convey the recording sheet into the conveying path extending from the recording sheet cassette 23, so that image formation can be performed on the side of the recording sheet opposite to the recorded side.

A description will now be given of an image forming process carried out by the color image forming apparatus 300 constructed as described above.

First, voltage is applied to the electrifier 7 so that the whole surface of the photosensitive body 1 can be negatively charged with a predetermined electrifier voltage. Next, the exposure device 8 comprised of a laser scanner exposes the charged photosensitive body 1 such that the voltage of an image area can be equal to a predetermined exposure section voltage, and as a result, a latent image is formed on the photosensitive body 1. The exposure device 8 turns on and off laser light according to an image signal transmitted from an image controller 38 so that a latent image corresponding to an image can be formed on the photosensitive body 1. As described later, the image controller 38 outputs image signals so that image formation and formation of predetermined mark images can be performed on a recording sheet.

The timing of image formation performed by the image forming apparatus 300 is controlled according to a signal ITOP generated based on a predetermined reference position on the belt 2. The belt 2 is stretched between the group of rollers consisting of the driving roller 17, the tension roller 18, and the backup roller 19, and a predetermined tension is applied to the belt 2 by the tension roller 19. A reflective position sensor 36 that detects the predetermined reference position on the belt 2 is disposed between the tension roller 18 and the backup roller 19.

Developing biases determined in advance for the respective colors are applied to respective developing rollers of the developing devices 13Y, 13M, 13C, and 13K, and a latent image on the photosensitive body 1 is developed using toners and visualized as a toner image when it passes through the developing rollers. The toner image is transferred onto the belt 2 by the transfer device 10, and is transferred onto a recording sheet by the transfer roller (secondary transfer device) 21. Thereafter, the recording sheet is fed to the fixing device 5. In the case of full-color printing, toner images of four colors are superimposed one upon the other on the belt 2, and then transferred onto a recording sheet. The residual toner on the photosensitive body 1 is removed and collected by the cleaner 12, and finally, the photosensitive body 1 is deelectrified to approximately 0 volt by a deelectrifier, not shown, so that the photosensitive body 1 can be ready for the next image formation cycle.

Reference numeral 100 denotes a mark detecting section that detects mark images printed on a recording sheet, and reference numeral 39 denotes a controller that is connected to the image controller 38 and the mark detecting section 100 and carries out communication with external apparatuses. The controller 39 causes a CPU therein, not shown, to collectively control the formation of normal images and the formation of predetermined mark images performed through the image controller 38, and the detection of predetermined mark images performed by the mark detecting section 100, and has an external interface function that provides interface for communication with the network 40 so that the controller 39 can be connected to an external apparatus such as the host server 303.

Figure 3:
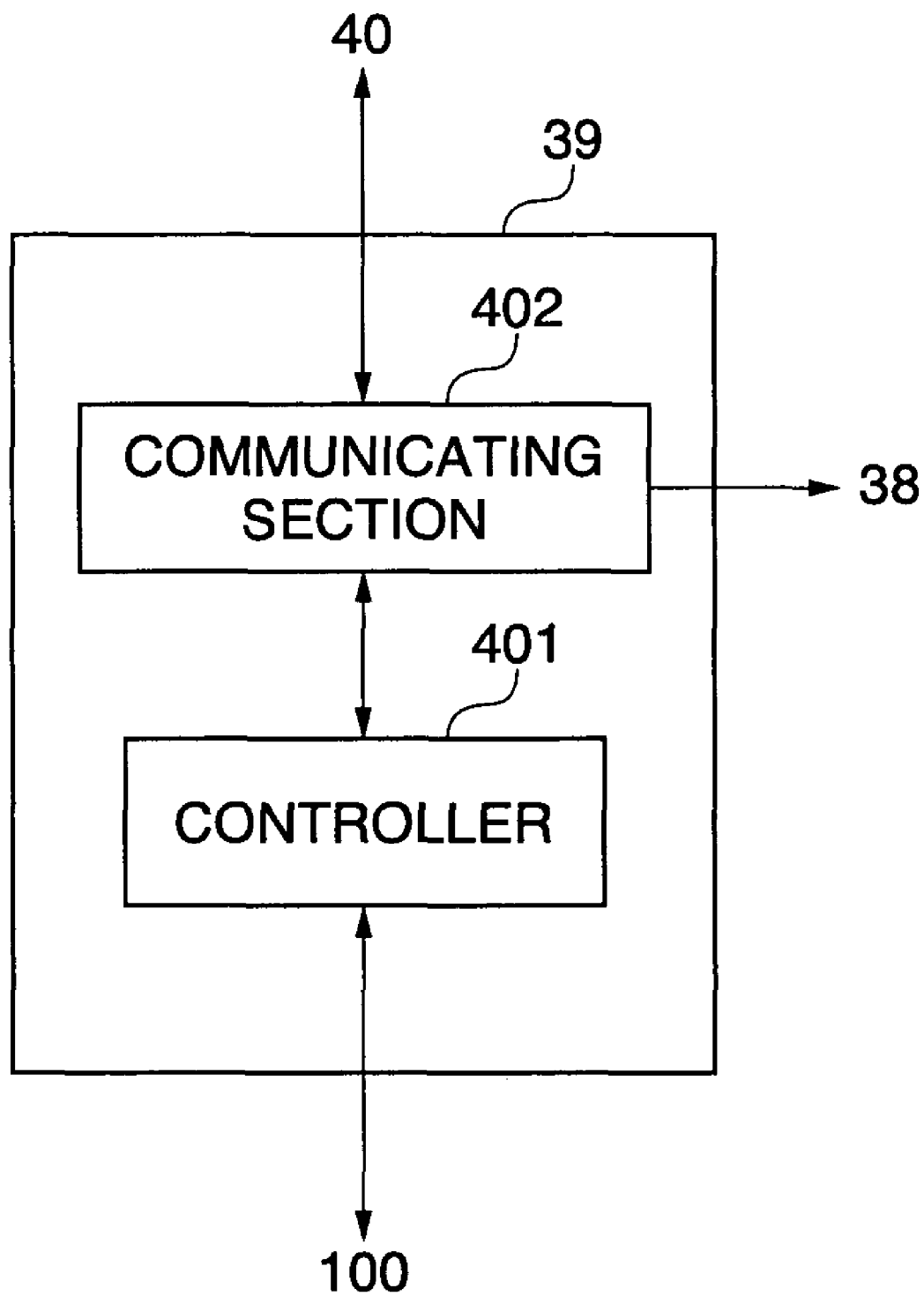
FIG. 3 is a block diagram showing the internal construction of a controller appearing in FIG. 2.

FIG. 3 is a block diagram showing the internal construction of the controller 39. Reference numeral 401 denotes a controller including the CPU that provides various kinds of control, and reference numeral 402 denotes a communicating section that communicates with the network 40. The controller 401 is connected to the communicating section 402 to exchange information with the host server 303 via the communicating section 402, transfers image data transmitted from the host server 303 to the image controller 38, and is connected to component parts such as the mark detecting section 100 of the image forming apparatus 300 to provide control.

Figure 4:
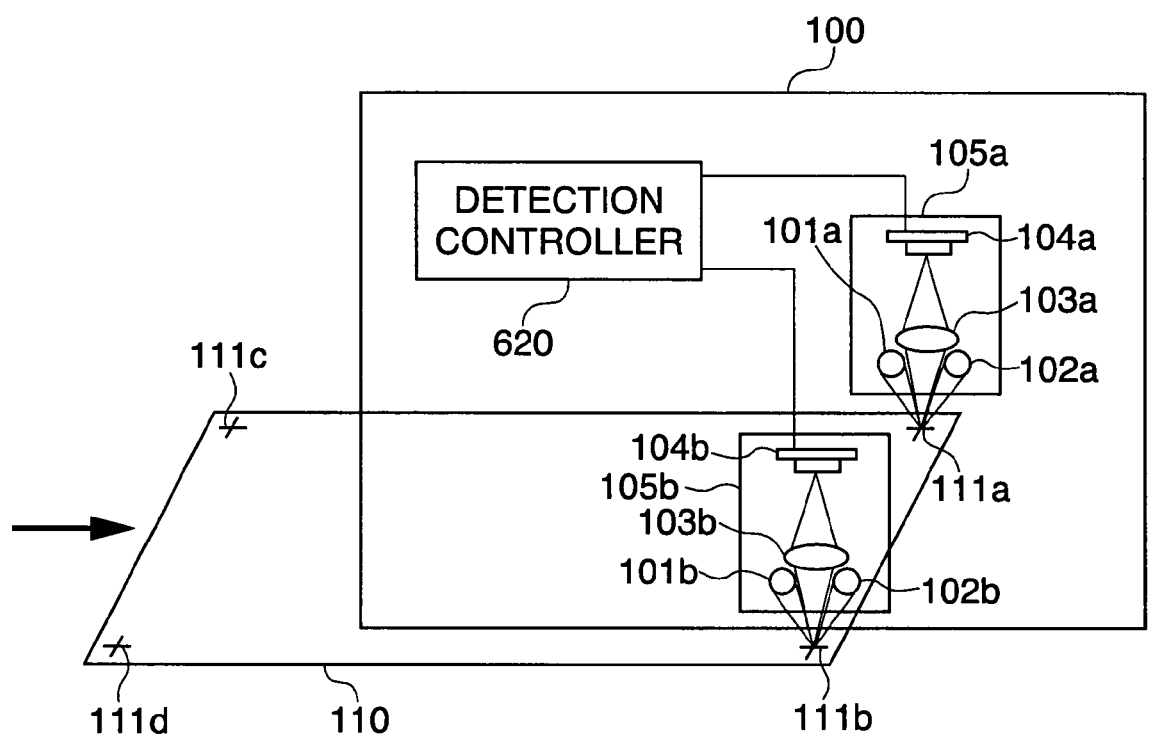
FIG. 4 is a view showing the internal construction of a mark detecting section and its positional relationship with a transfer medium.

FIG. 4 is a view showing the internal construction of the mark detecting section 100 and its positional relationship with a transfer medium (recording sheet). The mark detecting section 100 is comprised of two detecting sections 105a and 105b, and a detection controller 620. The two detecting sections 105a and 105b are arranged at such locations that four mark images 111a to 111d (for example, cross marks with predetermined widths) printed at both ends of one side of a transfer medium 110 conveyed in a direction of an arrow in FIG. 4 pass under the two detecting sections 105a and 105b, and can be detected thereby, respectively. The detecting section 105a is comprised of illumination lamps 101a and 102a, a condenser 103a, and a CCD sensor 104a. Similarly, the detecting section 105b is comprised of illumination lamps 101b and 102b, a condenser 103b, and a CCD sensor 104b. The illumination lamps 101a and 102a illuminate the mark images 111a and 111c, respectively, printed on the transfer medium 110 conveyed in the direction of the arrow, and reflected lights thus obtained are formed on the sensor 104a so that the detection controller section 620 can read the mark images 111a and 111c printed on the transfer medium 110. Similarly, the illumination lamps 101b and 102b illuminate the mark images 111b and 111d printed on the transfer medium 110 conveyed in the direction indicated by the arrow, and reflected lights thus obtained are formed on the sensor 104b so that the detection controller section 620 can read the mark images 111b and 111d printed on the transfer medium.

Figure 5:
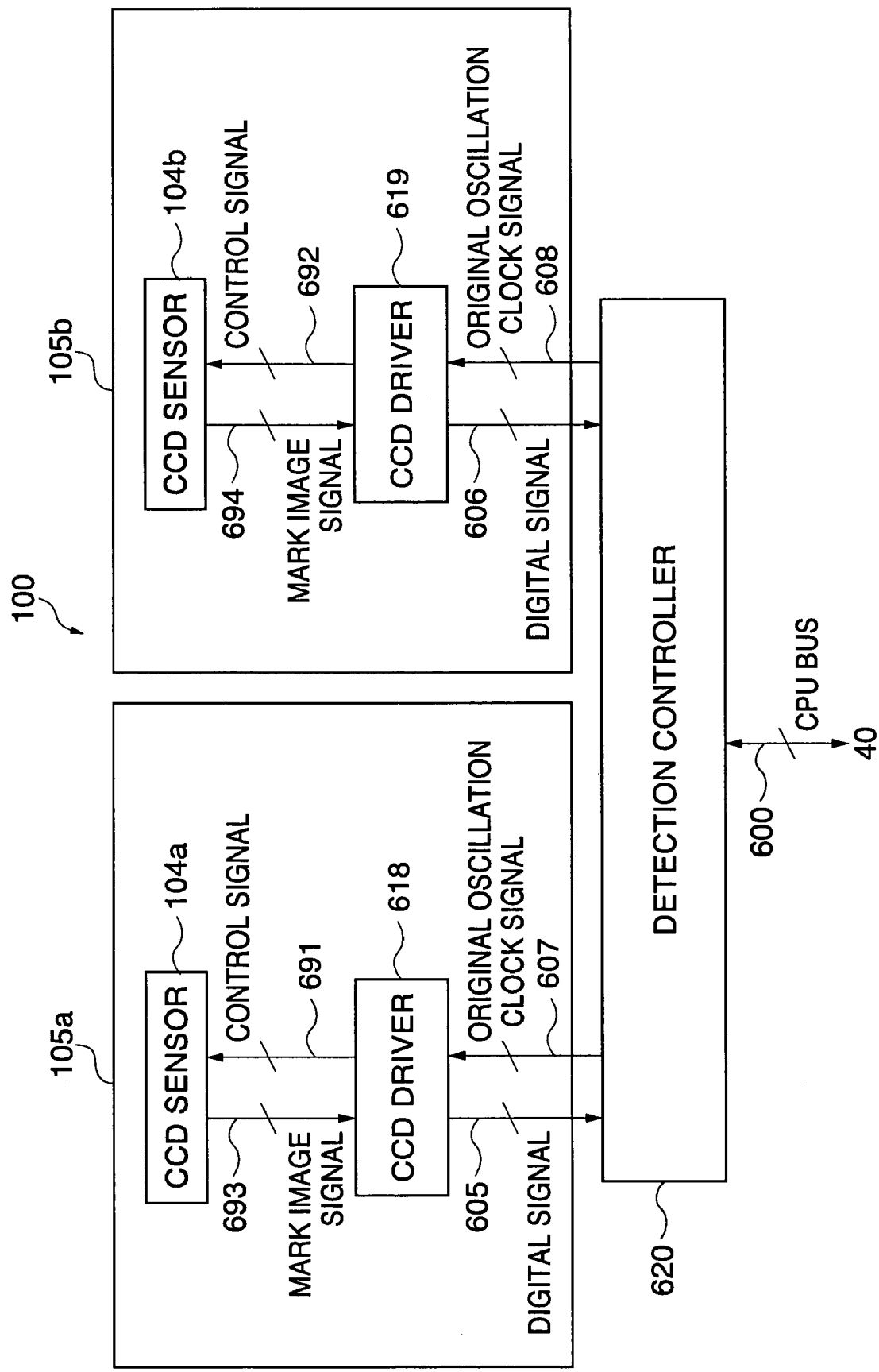
FIG. 5 is a block diagram showing the internal construction of the mark detecting section.

FIG. 5 is a block diagram showing the internal construction of the mark detecting section 100. The mark images 111a and 111c and the mark images 111b and 111d formed on the transfer medium 110 in FIG. 4 are read by the CCD sensors 104 and 104b, respectively. The detection controller 620 transmits original oscillation clock signals 607 and 608 to CCD drivers 618 and 619, respectively. The CCD drivers 618 and 619 generate control signals 691 and 692 in response to the original oscillation clock signals 607 and 608, respectively, required for driving the CCD sensors 104a and 104b, and supply the generated control signals 691 and 692 to the CCD sensors 104a and 104b, respectively. The CCD sensor 104a and 104b read the mark images 111a and 111c and the mark images 111b and 111d, respectively according to the control signals 691 and 692, and transmits mark image signals 693 and 694 to the CCD drivers 618 and 619, respectively. The CCD drivers 618 and 619 perform processing such as amplification, direct current regeneration, and A/D conversion on the respective mark image signals 693 and 694, and transmits the resulting digital signals 605 and 606 to the detection controller 620.

The detection controller 620 creates mark image density histogram data based on the received digital signals 605 and 606 as described later. By referring to the data, the controller 39 recognizes mark images (for example, cross marks with predetermined widths), and if recognizing mark images, the controller 39 calculates the distance between the mark images 111a and 111b, the distance between the mark images 111c and 111d, and the distance between the mark images 111a and 111c, and the distance between the mark images 111b and 111d.

Figure 6:
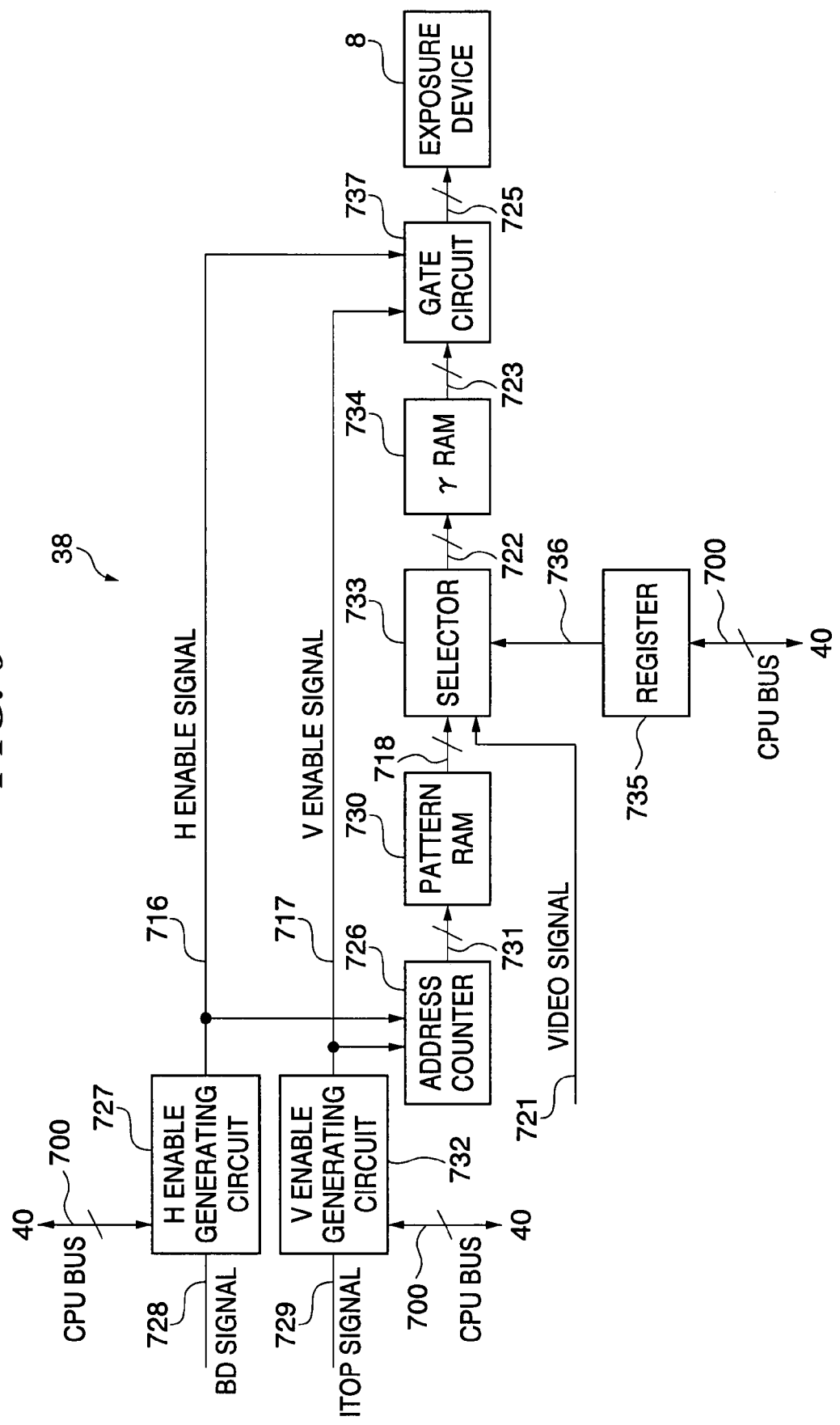
FIG. 6 is a circuit block diagram showing in detail the construction of a mark image forming section included in an image controller appearing in FIG. 2.

FIG. 6 is a circuit block diagram showing the detailed construction of a mark image forming section included in the image controller 38 appearing in FIG. 2. The mark image forming section is intended to print the four mark images 111a to 111d (for example, cross marks with predetermined widths) at both ends of one side of the transfer medium 110. Although the mark image forming section in FIG. 6 is capable of handling normal print images (video signals) other than mark images, printing of mark images by the mark image forming section prints mark images will be mainly described in the following.

A beam detect (BD) signal 728 is applied to a main scanning direction enable signal generating circuit (H enable generating circuit) 727. The BD signal 728 is a synchronization signal for the main scanning direction, which is generated from a sensor, not shown, disposed outside a recording area when a laser beam scans the sensor. The H enable generating circuit 727 having received the BD signal 728 outputs, for example, an H enable signal 716 for printing a mark image. On the other hand, a start signal (ITOP signal) 729 for printing a mark image is applied to a sub-scanning direction enable signal generating circuit (V enable generating circuit) 732. As described above, the ITOP signal is generated based on the predetermined reference position on the belt 2. The V enable generating circuit 732 having received the ITOP signal 729 outputs a V enable signal 717 for printing a mark image. Each of the H enable generating circuit 727 and the V enable generating circuit 732 is connected to a CPU bus 700, and includes a counter circuit. In each counter circuit, a predetermined count value is set by the CPU provided in the controller 39, and a high-level enable signal is generated over a period of time in which the predetermined count value is incremented. Both the H enable signal 716 and the V enable signal 717 are supplied to an address counter 726, which generates an address signal 731 for reading out a mark image from a pattern RAM 730 and outputs the same to the pattern RAM 730. The pattern RAM 730 outputs a mark image corresponding to the address signal 731 as a mark image signal 718 to one input terminal of a selector 733. The mark image signal 718 is indicative of a cross pattern, for example.

A video signal 721 is inputted to the other input terminal of the selector 733. A register 735 outputs a selection signal 736 to the selector 733 under the control of the CPU provided in the controller 39. Specifically, in response to the selection signal 736, the selector 733 selects the mark image signal 718 and outputs the same as an image signal 722 to a γRAM 734 in a mark image formation mode, for example. In a video image formation mode, the selector 733 selects the video signal 721 and outputs it as the image signal 722 to the γRAM 734. The γRAM 734 performs γ-reconversion on the inputted image signal 722, and outputs image information 723 obtained by the γ-conversion to a gate circuit 737.

The H enable signal 716 and the V enable signal 717 are inputted to the gate circuit 737, and in the case where the H enable signal 716 and the V enable signal 717 are at a high level, the gate circuit 737 outputs the image information 723 after the γ-conversion to the exposure device 8. Thus, the image information 723 after the γ-conversion is supplied to the exposure device 8 to form a latent image on the photosensitive body 1 via an optical scanning system, not shown. It should be noted that the case where the H enable signal 716 and the V enable signal 717 are at a high level means the case where the optical scanning system performs scanning using a laser beam inside the recording area.

Next, a description will be given of a mark image density histogram data creating process carried out by the detection controller 620 with reference to FIGS. 7, 8A, 8B, and 9.

Figure 7:
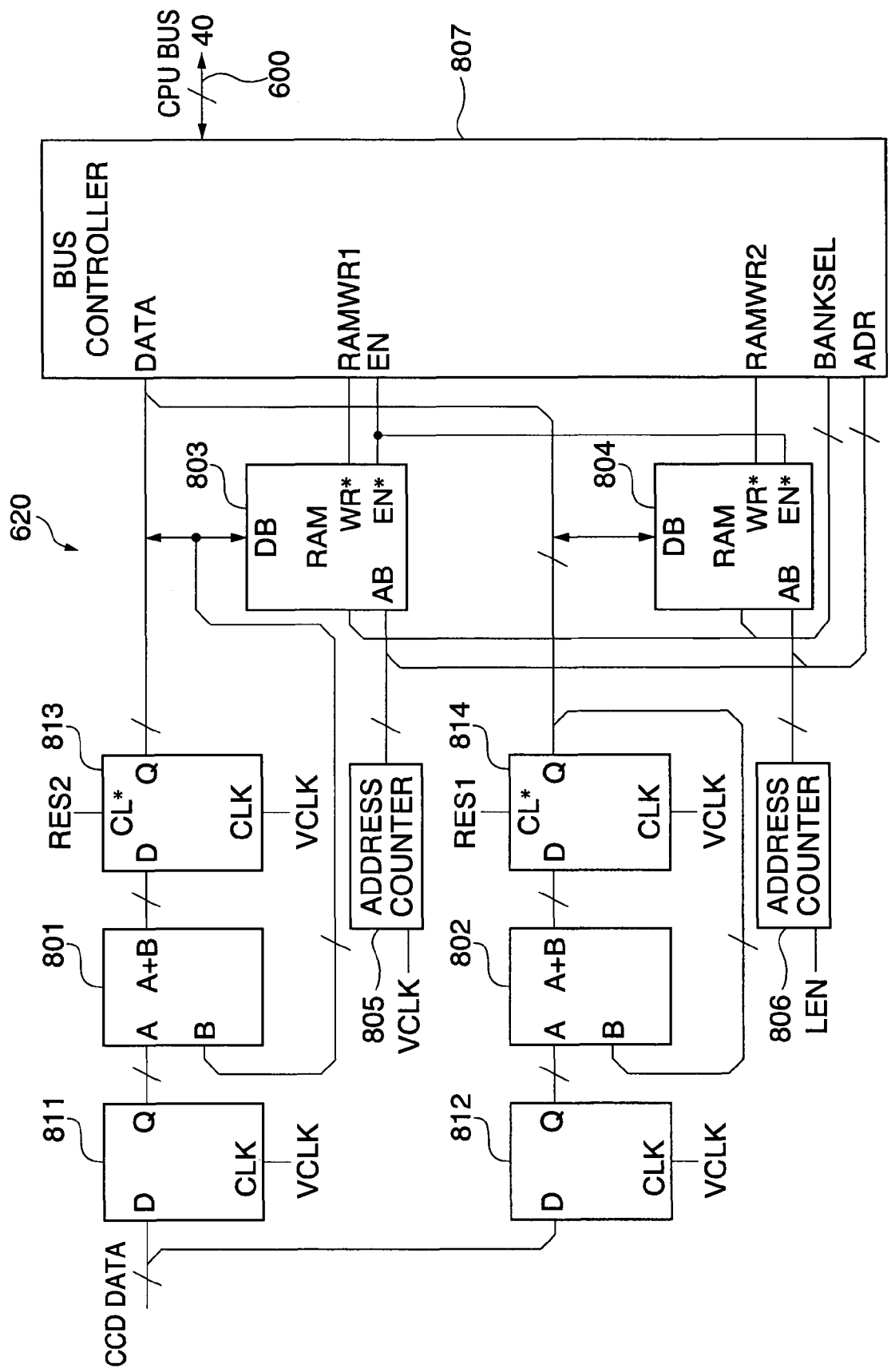
FIG. 7 is a block diagram showing essential parts of a detection controller appearing in FIG. 5.
Figure 8A:
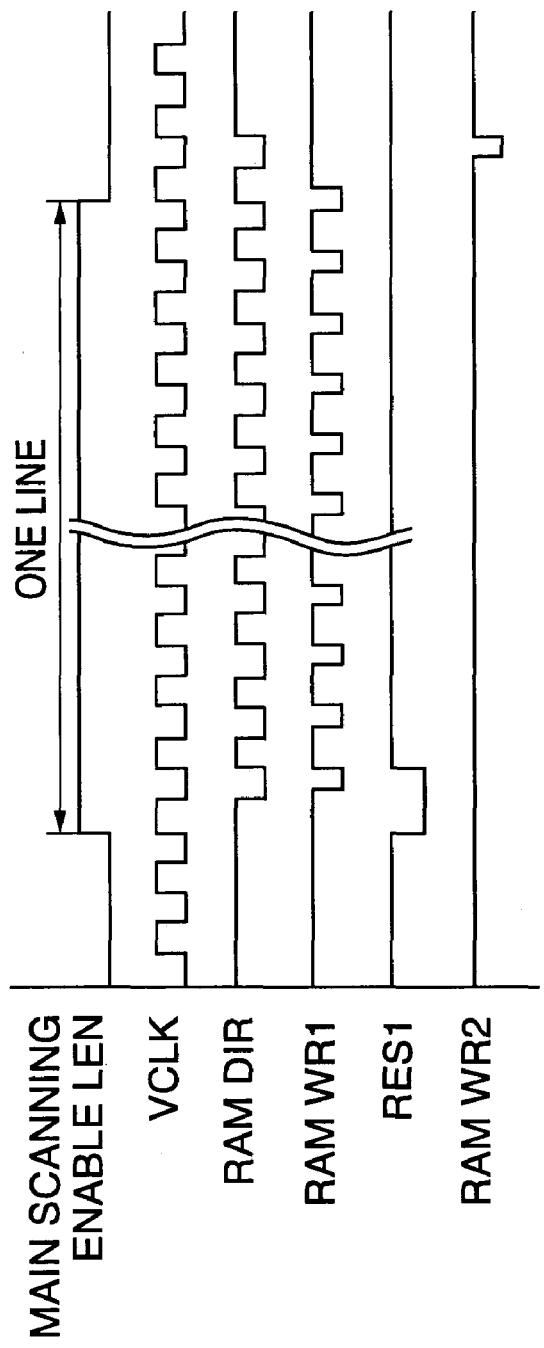
Figure 8B:
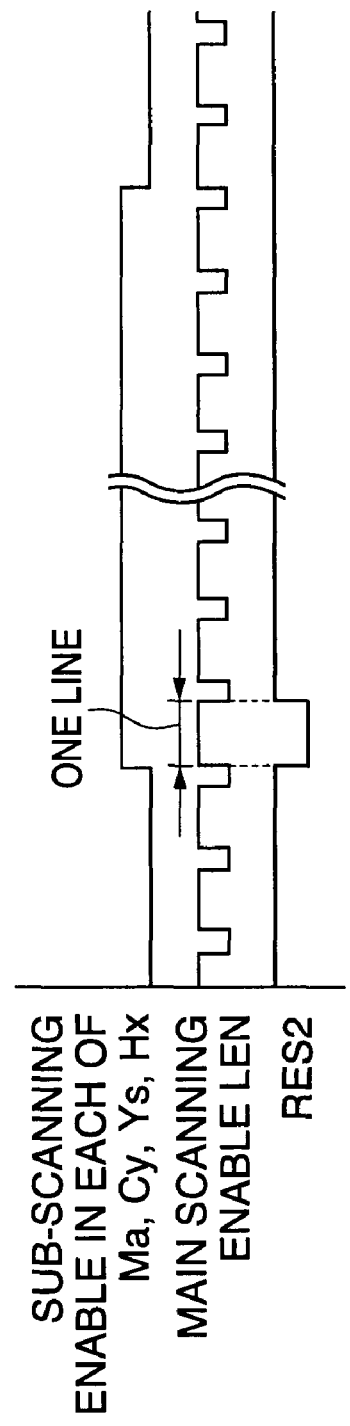
Figure 9:
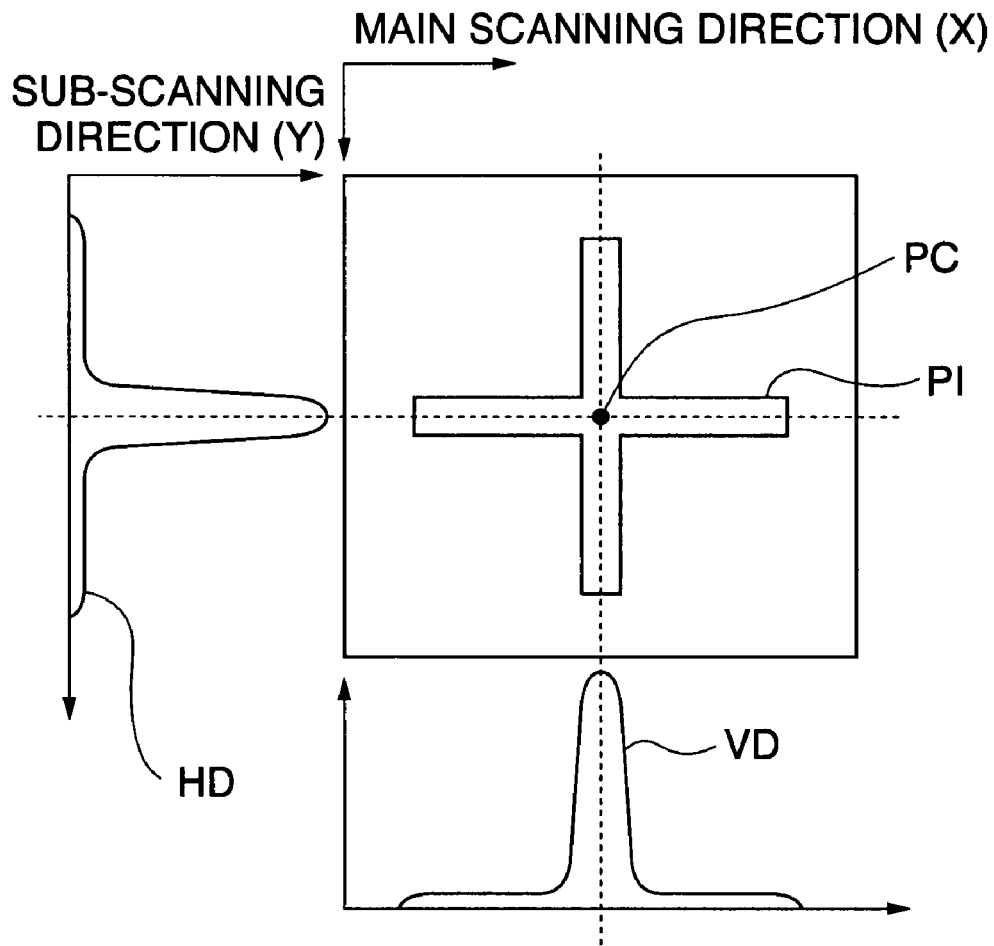
FIG. 9 is a diagram showing density histogram data of a mark image produced by the detection controller section, in which the left side of FIG. 9 shows a main scanning direction histogram HD obtained by integrating density values of the mark image in the main scanning direction, and the lower side of FIG. 9 shows a sub-scanning direction histogram VD obtained by integrating density values of the mark image in the sub-scanning direction.

FIG. 7 is a block diagram showing the essential parts of the detection controller 620 in FIG. 5. FIGS. 8A and 8B are timing charts showing how the detection controller in FIG. 7 operates. FIG. 8A shows operation of the detection controller 620 for approximately one line in the main scanning direction, and FIG. 8B shows operation of the detection controller 620 for multiple lines in the main scanning direction. FIG. 9 is a diagram showing the mark image density histogram data produced by the detection controller 620, in which the left side of FIG. 9 shows a main scanning direction histogram HD obtained by integrating density values of a mark image in the main scanning direction, and the lower side of FIG. 9 shows a sub-scanning direction histogram VD obtained by integrating density values of the mark image in the sub-scanning direction.

In FIG. 7, the digital signals 605 and 606 in FIG. 5 are inputted as CCD data to D-type flip-flops 811 and 812, respectively. Reference numerals 813 and 814 also denote D-type flip-flops; 801 and 802, adders that add signal values inputted to input terminals A and B thereof; 803 and 804, RAMs that store respective input mark image density histograms; and 807, a bus controller that outputs a variety of timing signals, a bank selection signal BANKSEL, and so forth. The detection controller 620 creates density histogram data indicative of density histograms in the main scanning direction and the sub-scanning direction for each mark image based on data acquired by reading each mark image.

First, to create the density histogram data for the main scanning direction, as shown in FIG. 8A, the flip-flop 814 is initialized (cleared) in response to a reset signal RES1, and density data on pixels of one line in the main scanning direction are added up by the adder 802 in synchronism with a video clock VCLK based on image data acquired from one mark image, and the resulting integration data of one line is written into the RAM 804 in accordance with a write signal RAMWR2. It should be noted that the address location at which the integration data is to be written into the RAM 804 is determined by an address counter 806 according to a main scanning enable signal LEN. By performing the integrating processing on density data on pixels of all lines in the main scanning direction, integration values of the respective lines are written into respective address locations in the RAM 804, which are specified by the address counter 806. In this way, the main scanning direction histogram HD shown on the left side of FIG. 9 is obtained.

On the other hand, to create the density histogram data for the sub-scanning direction, as shown in FIG. 8B, the flip-flop 813 is initialized (cleared) in response to a reset signal RES2, and a read modify write operation is repeated for respective pixels constituting each line in the main scanning direction based on image data obtained from one mark image in response to a write signal RAMWR1 and data direction switching signal RAMDIR, and integration values of density data on respective pixels arranged on the same line in the sub-scanning direction are calculated and stored in the RAM 803. Specifically, integral values stored previously in the RAM 803 are read out for respective pixels constituting each line in the main scanning direction, and new pixel density data is added to the integral value by the adder 801, and the resulting value is stored again in the RAM 803 in synchronism with the write signal RAMWR1. An address counter 805 determines storage locations of integration data in the RAM 803 such that pixels arranged on the same line in the sub-scanning direction are stored at the same storage locations. In this way, the sub-scanning direction histogram VD shown on the lower side of FIG. 9 is obtained.

It should be noted that each of the RAMS 803 and 804 discriminates the four mark images 111a to 111d according to the bank selection signal BANKSEL, so that memory spaces for integration data on the respective mark images 111a to 111d can be used appropriately.

The integration data on each mark image in the main scanning direction thereof and the sub-scanning direction thereof is transmitted to the controller 39, whose CPU performs mark recognition on each mark image based on the integration data. If recognizing mark images, the CPU of the controller 39 detects central positions of the respective mark images (central positions at which peak values of the integration data lie), and calculates the distance between two mark images (for example, 111a and 111b) in the main scanning direction and the distance between two mark images (for example, 111a and 111c) in the sub-scanning directions based on the detected central positions.

It should be noted that the way of printing mark images depends on a printing method (full-color/black-and-white printing, double-sided/one-sided printing, and print speed) adopted for printing original images by the printer, and upon the lapse of a period of time required for a transfer sheet to return to its original size, each mark image is read and integration data is calculated.

Figure 10:
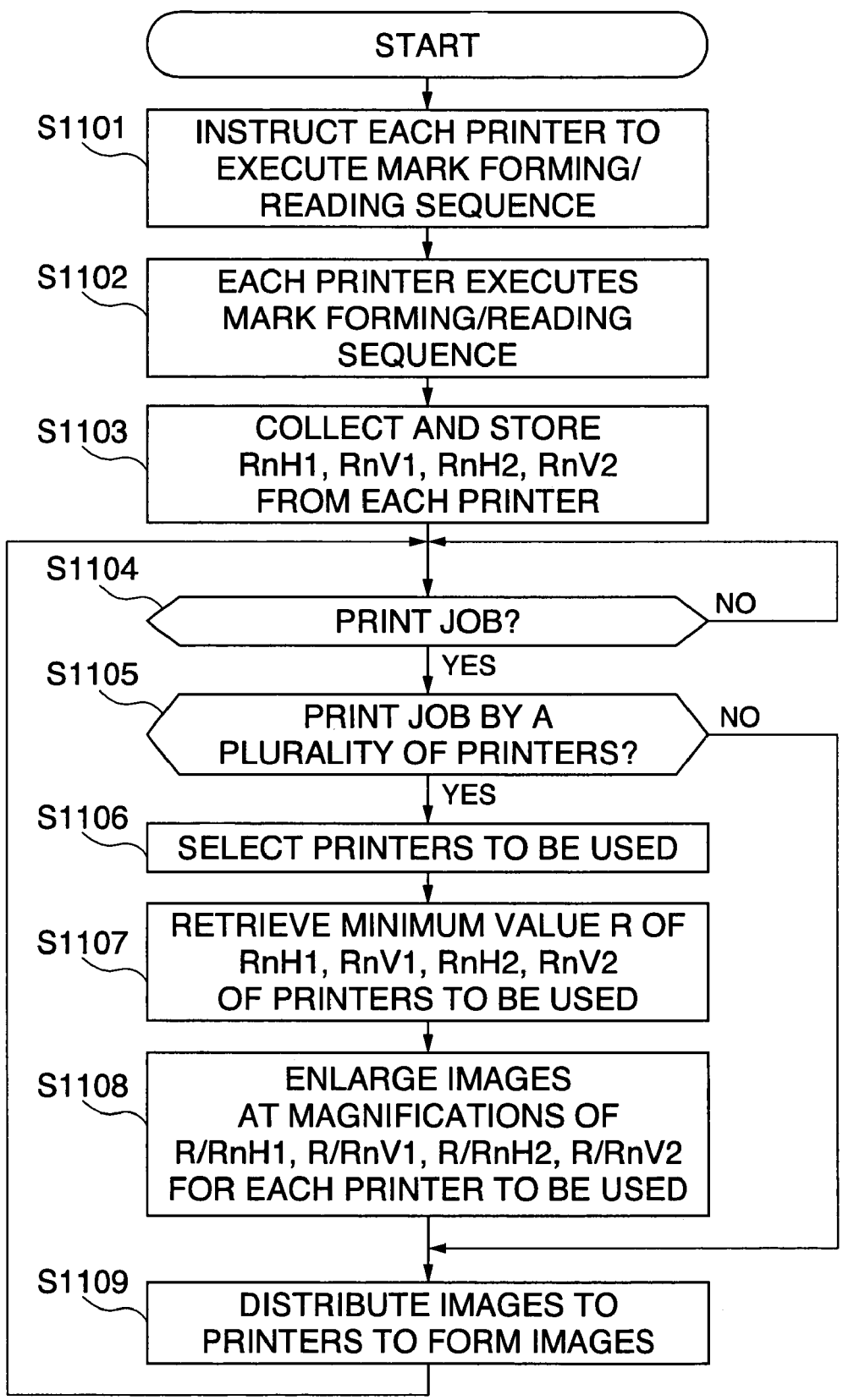
FIG. 10 is a flow chart showing an image forming process carried out by the image forming system in FIG. 1, including processing for printing and reading mark images, and correcting the image size when printing original images based on integration data by respective printers.

FIG. 10 is a flow chart showing an image forming process carried out by the image forming system in FIG. 1, including processing for printing and reading a mark image and correcting the image size when printing an original image printing based on integration data by each printer.

The host server 303 instructs the printers 301 and 302 to perform a predetermined sequence (step S1101). In this predetermined sequence, each printer is instructed to print mark images on a transfer sheet by the same method as a printing method (full-color/black-and-white printing, double-sided/one-sided printing, and print speed) that should be adopted for printing original images by the printer, and to read the mark images and calculate integration data upon the lapse of the period of time required for the transfer sheet to return to its original size. In accordance with the instruction, the printers 301 and 302 execute the sequence (step S1102). It is assumed here that double-sided printing is performed. It should be noted that the printers 301 and 302 calculate the distance between two printed mark images (for example, 111a and 111b) in the main scanning direction and the distance between two printed mark images (for example, 111a and 111c) in the sub-scanning direction. On the basis of the calculation results, a printer n calculates a main scanning direction image reduction ratio RnH1 for the first side of the transfer sheet, a sub-scanning direction image reduction ratio RnV1 for the first side of the transfer sheet, a main scanning direction image reduction ratio RnH2 for the second side of the transfer sheet, and a sub-scanning direction image reduction ratio RnV2 for the second side of the transfer sheet as described later.

The host server 303 collects the main scanning direction and sub-scanning direction image reduction ratios for the first and second sides from the printers, and stores them (step S1103). For example, the host server 303 collects the reduction ratios RnH1, RnV1, RnH2 and RnV2 from the printer n, and stores them.

Although in the present embodiment, each printer calculates the distance between mark images and the image reduction ratios, the host server 303 may calculate the distance between mark images and the image reduction ratios.

Next, when a print job occurs in which transfer sheets printed by original image printing using a plurality of printers are bound up ("YES" in step S1104 and step S1105), printers suitable for the contents of the job on each page such as color/black-and-white, the number of pages to be printed, and so forth are selected to be used (step S1106). Then, the minimum reduction ratio is found from the main scanning direction and sub-scanning direction image reduction ratios for the first and second sides in all of the printers to be used, and the obtained value is regarded as a minimum value R (step S1107).

Then, before distributing image data on an original image to be printed by the printer n to the printer n, the host server 303 enlarges an image to be printed on the first side of the transfer sheet at a magnification of R/RnH1 in the main scanning direction and at a magnification of R/RnV1 in the sub-scanning direction, and enlarges an image to be printed on the second side of the transfer sheet at a magnification of R/RnH2 in the main scanning direction and at a magnification of R/RnV2 in the sub-scanning direction (step S1108). Then, the host server 303 distributes the enlarged image data to the respective printers, and the printers form the images onto transfer sheets (step S1109).

Each printer calculates the image reduction ratios during each mark image reading sequence as described below.

Specifically, on the basis of mark image data obtained from the two detecting sections 105a and 105b which are arranged in spaced relation in the main scanning direction, the printer n calculates the interval between the respective central positions of two mark images on the first side of the transfer sheet, i.e. a main scanning direction mark position interval nH1 for the first side, and the interval between the respective central positions of two mark images on the second side of the transfer sheet, i.e. a main scanning direction mark position interval nH2 for the second side. Further, on the basis of data on two mark images (for example, 111a and 111c) read at different times, which is acquired from one of the detecting sections 105a and 105b, the printer n calculates the interval between the respective central positions of two mark images on the first side of the transfer sheet, i.e. a sub-scanning direction mark position interval nV1 for the first side, and the interval between the respective central positions of two mark images on the second side of the transfer sheet, i.e. a sub-scanning direction mark position interval nV2 for the second side. These calculations are performed based on time interval data on two mark images (for example, 111a and 111c) obtained from one of the detecting sections 105a and 105b.

Assuming that the main scanning direction mark position interval and the sub-scanning direction mark position interval of an original mark image during printing performed by the printer n are designated by nH and nV, respectively, main scanning direction image reduction ratios RnH1 and RnH2 and sub-scanning direction image reduction ratios RnV1 and RnV2 are calculated using the mark position intervals nH1, nV1, nH2, and nV2. Specifically, the main scanning direction image reduction ratio RnH1 for the first side of the transfer sheet is calculated according to the expression of RnH1=nH1/nH, the sub-scanning direction image reduction ratio RnV1 for the first side of the transfer sheet is calculated according to the expression of RnV1=nV1/nV, the main scanning direction image reduction ratio RnH2 for the second side of the transfer sheet is calculated according to the expression of RnH2=nH2/nH, and the sub-scanning direction image reduction ratio RnV2 for the second side of the transfer sheet is calculated according to the expression of RnV2=nV2/nV In the case where the printer n prints image marks on the first side of a transfer sheet (the main scanning direction mark position interval nH and the sub-scanning direction mark position interval nV) and measures the image marks to find the main scanning direction mark position interval nH1 and the sub-scanning direction mark position interval nV1 upon the lapse of enough time after fixing, the transfer sheet may not always perfectly return to its original size even if absorbing enough moisture in the air. For this reason, the main scanning direction image reduction ratio RnH1 (=nH1/nH) for the first side and the sub-scanning direction image reduction ratio RnV1 (=nV1/nV) for the first side are each equal to 1 or slightly smaller than 1.

In printing an original image on the first side of a transfer sheet by the printer n, the size of the image to be printed is enlarged in advance at a magnification of 1/RnH1 (=nH/nH1) in the main scanning direction and at a magnification of 1/RnV1 (=nV/nV1) in the sub-scanning direction so that the printed image can be equal to its original size when enough time has elapsed after fixing.

On the other hand, in a state where a transfer sheet is kept shrunk immediately after the printer n prints and fixes image marks on the first side of the transfer sheet, if image marks are printed on the second side (the main scanning direction mark position interval nH and the sub-scanning direction mark position interval nV) and are measured to find the main scanning direction mark position interval nH2 and the sub-scanning direction mark position interval nV2 upon the lapse of enough time after fixing, the main scanning direction image reduction ratio RnH2 (=nH2/nH) for the second side and the sub-scanning direction image reduction ratio RnV2 (=nV2/nV) for the second side are each greater than 1.

In printing an original image on the second side of a transfer sheet by the printer n, the size of the image to be printed is enlarged (actually reduced) in advance at a magnification of 1/RnH2 (=nH/nH2) in the main scanning direction and is enlarged (actually reduced) at a magnification of 1/RnV2 (=nV/nV2) in the sub-scanning direction so that the printed image can be equal to its original size when enough time has elapsed after fixing.

By the way, if the size of an image to be printed is enlarged in advance before printing, a chipped image may be finally obtained since printing is not performed on an area outside the image forming region. To address this problem, according to the present invention, in the steps S1107 and S1108 in FIG. 10, the minimum value R is found from the image reduction ratios of all the printers to be used, and before the host server 303 distributes image data to be printed by the printer n to the printer n, an image to be printed on the first side of a transfer sheet is enlarged at a magnification of R/RnH1 in the main scanning direction and at a magnification of R/RnV1 in the sub-scanning direction, and an image to be printed on the second side of the transfer sheet is enlarged at a magnification of R/RnH2 in the main scanning direction and at a magnification of R/RnV2 in the sub-scanning direction.

As a result, if original images are printed on the first and second sides of a transfer sheet and enough time has elapsed after fixing, the sizes of the printed images are uniformly enlarged from their original sizes at a magnification of R on both the first side and the second side, and in both the main scanning direction and the sub-scanning direction, so that the images printed by all the printers used can be equal in size.

Although in the above described first embodiment, the mark image forming section in FIG. 6 and the detection controller 620 in FIG. 7 are implemented by hardware, they may be implemented by software with the same functions, which are executed by, for example, the CPU in the controller 39.

A description will now be given of a second embodiment of the present invention. The second embodiment is basically identical in construction with the first embodiment, and therefore elements and parts corresponding to those of the first embodiment are designated by identical reference numerals, and duplicate description thereof is omitted.

Figure 11:
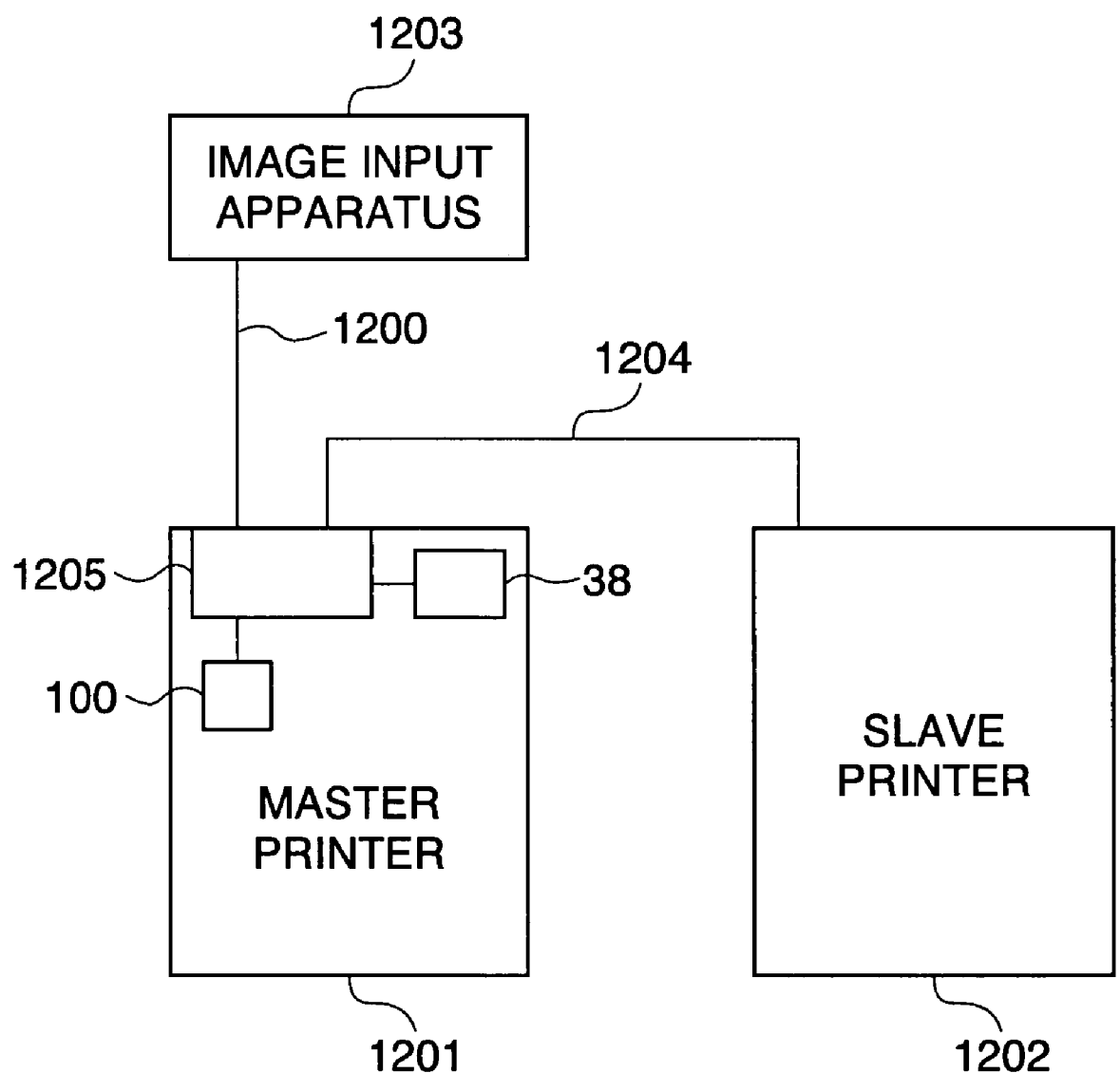
FIG. 11 is a block diagram showing the arrangement of an image forming system according to a second embodiment of the present invention.

FIG. 11 is a block diagram showing the arrangement of an image forming system according to the second embodiment of the present invention. In the second embodiment, one printer is used a master printer 1201, and another printer is used as a slave printer 1202, and they are connected to each other via a cable 1204. Although only one slave printer shown in FIG. 11, there may be a plurality of slave printers. The master printer 1201 and the slave printer 1202 have the same functions as the printers according to the first embodiment, i.e., the function of printing original images and mark images, the function of reading mark images, the function of calculating the reduction ratio of the distance between mark images, the communicating function, and so forth.

An image input apparatus 1203 having a communicating function is connected to the master printer 1201 via a network 1200. The image input apparatus 1203 is implemented by a personal computer or an image scanner, and is capable of transmitting image data to be printed to the master printer 1201. The master printer 1201 temporarily stores the transmitted image data and transfers predetermined image data to respective printers including the master printer 1201. Before the transfer, the sizes of images to be printed by respective printers are enlarged/reduced to make uniform the sizes of print images, which should originally be the same in size, between transfer sheets printed by all of the printers.

The master printer 1201 includes a controller 1205. The mark detecting section 100 that detects mark images to create density histogram data and the image controller 38 that forms an original image and mark images as in the above described first embodiment are connected to the controller 1205.

Figure 12:
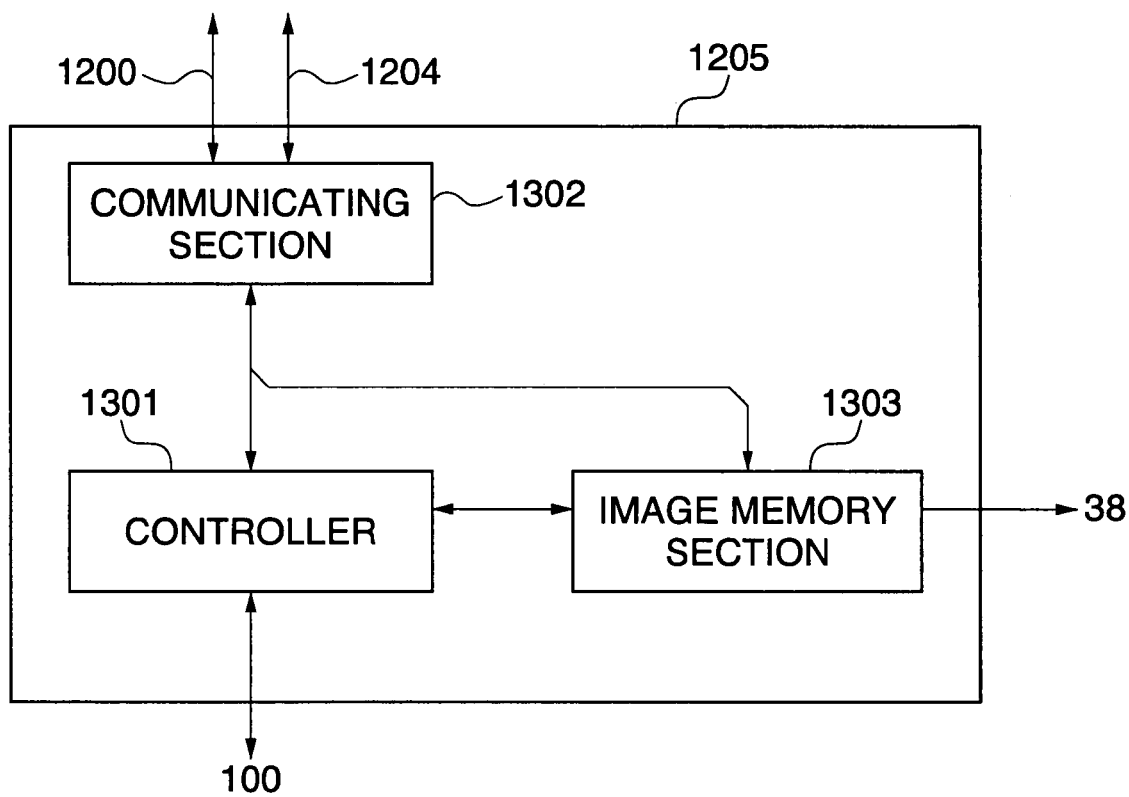
FIG. 12 is a block diagram showing the internal construction of a controller appearing in FIG. 11.

FIG. 12 is a block diagram showing the internal construction of the controller 1205. Reference numeral 1301 denotes a controller including a CPU that controls various operations; 1302, a communicating section that communicates with the network 1200 and the slave printer 1202; and 1303, an image memory section that stores image data transmitted from the image input apparatus 1203 on the network 1200. The controller 1301 controls the communicating section 1302 and the image memory section 1303, and is connected to component parts including the mark detecting section 100 in the master printer 1201. The image memory section 1303 transfers image data to the image controller 38 in the master printer 1201.

Figure 13:
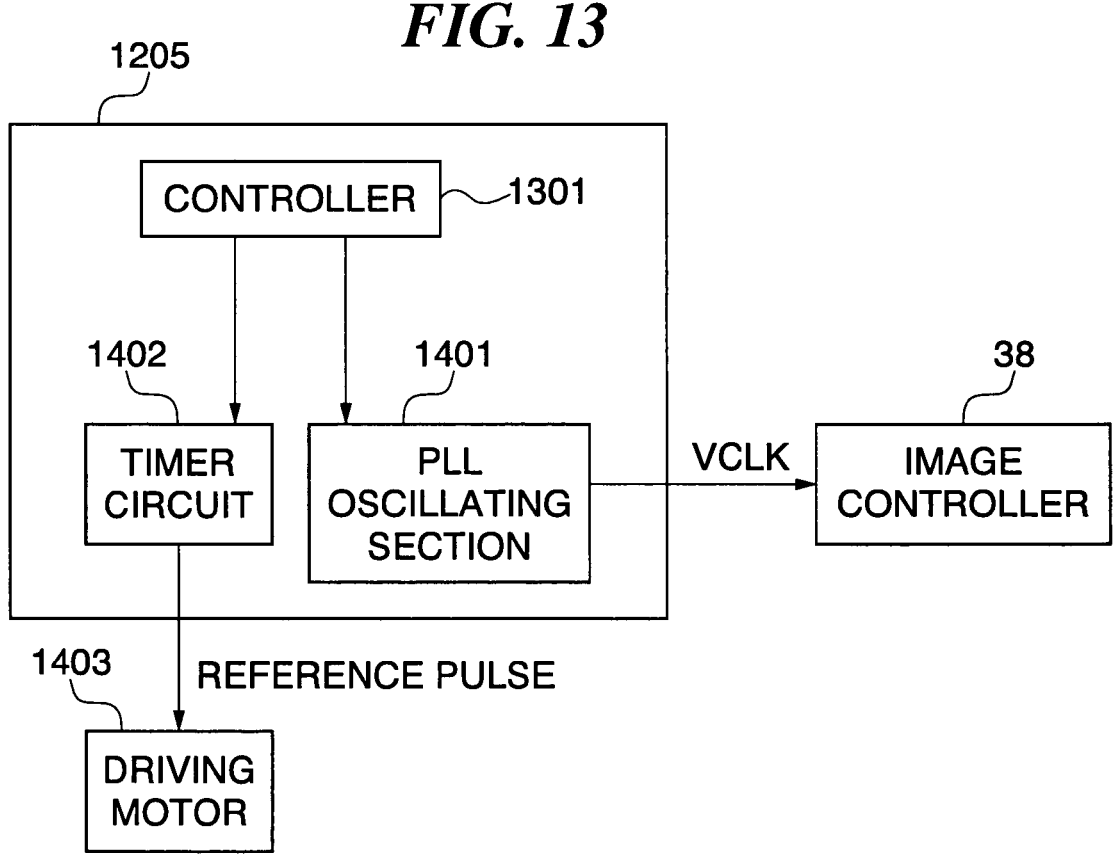
FIG. 13 is a view showing the hardware construction of the controller, which is used to enlarge or reduce the size of an original image before image data is transferred to each printer.

FIG. 13 shows the hardware construction of the controller 1205 for use in an original image enlarging/reducing process carried out before image data is transferred to each printer.

An image is enlarged/reduced in the main scanning direction by finely adjusting the frequency of a video clock VCLK for controlling an image printing process, which is supplied from the controller 1205 to the image controller 38. Increasing the frequency of the video clock VCLK reduces the size of an image, and decreasing the frequency of the video clock VCLK enlarges the size of an image. Specifically, a PLL oscillating section 1401 comprised of a PLL synthesizer circuit that generates the video clock VCLK finely adjusts the frequency of the video clock VCLK which is several tens of MHz.

On the other hand, an image is enlarged/reduced in the sub-scanning direction by finely adjusting the rotational speed of a driving motor 1403, which rotatively drives the photosensitive body 1. The driving motor 1403 is usually implemented by a pulse motor or a DC brushless motor, and if the driving motor 1403 is implemented by either motor, a reference pulse with a frequency of about several kHz is supplied to the driving motor 1403 so that the rotational speed thereof can be controlled according to the reference pulse. The rotational speed can be finely adjusted by varying the frequency of the referenced pulse. Specifically, the number of frequency divisions made by a timer circuit 1402 which supplies the reference pulse to the driving motor 1403 and has a source clock with a frequency of about several MHz, and the frequency of the reference pulse is finely adjusted by several kHz. If the rotational speed of the driving motor 1403 is increased by raising the frequency of the reference pulse, the size of an image is enlarged, and on the other hand, if the rotational speed of the driving motor 1403 is decreased by lowering the frequency of the reference pulse, the size of an image is reduced.

Figure 14A:
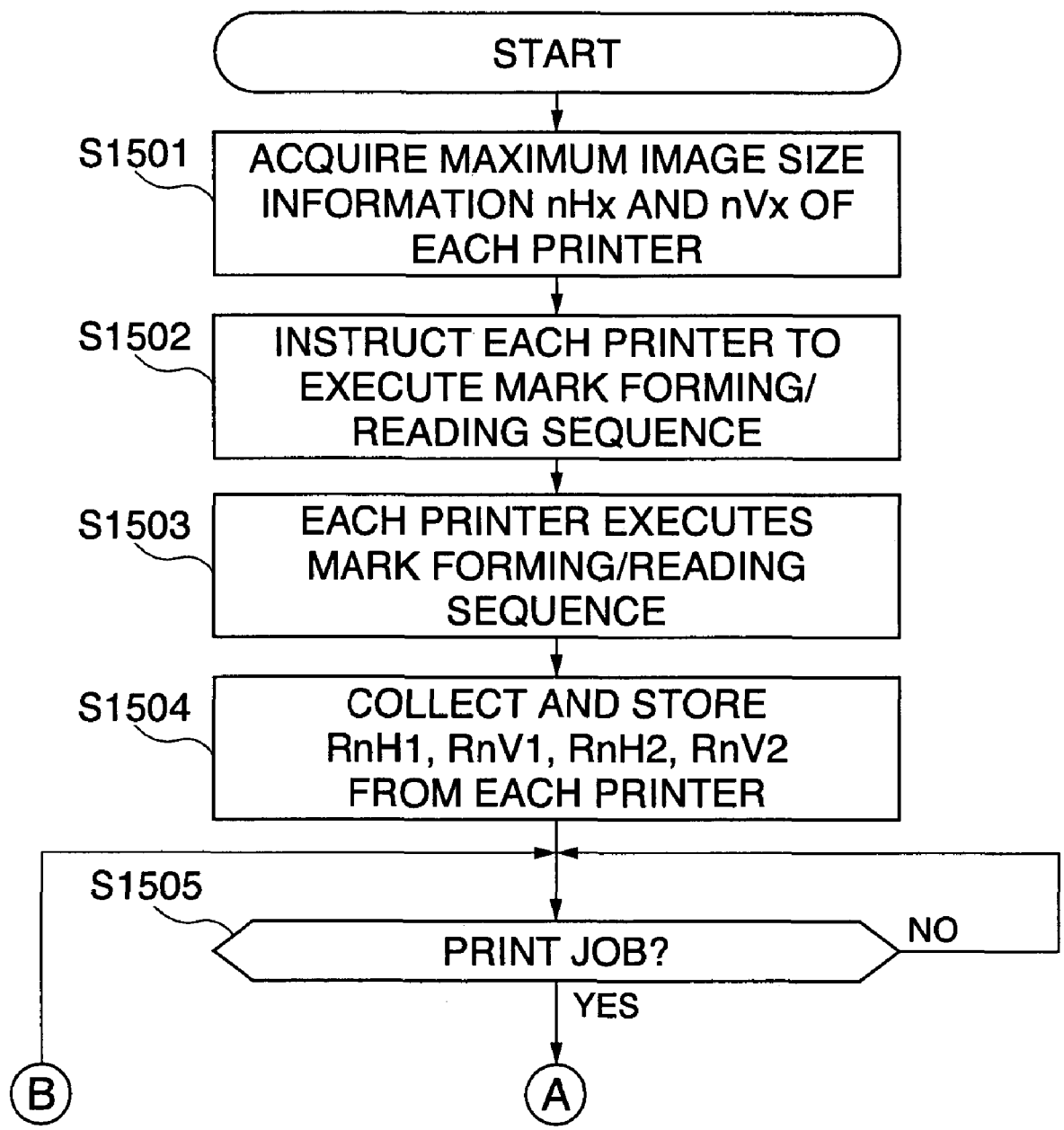
FIGS. 14A and 14B is a flow chart showing an image forming process carried out by the image forming system in FIG. 11, including processing for printing and reading mark images, and correcting the image size when printing original images based on integration data by respective printers.
Figure 14B:
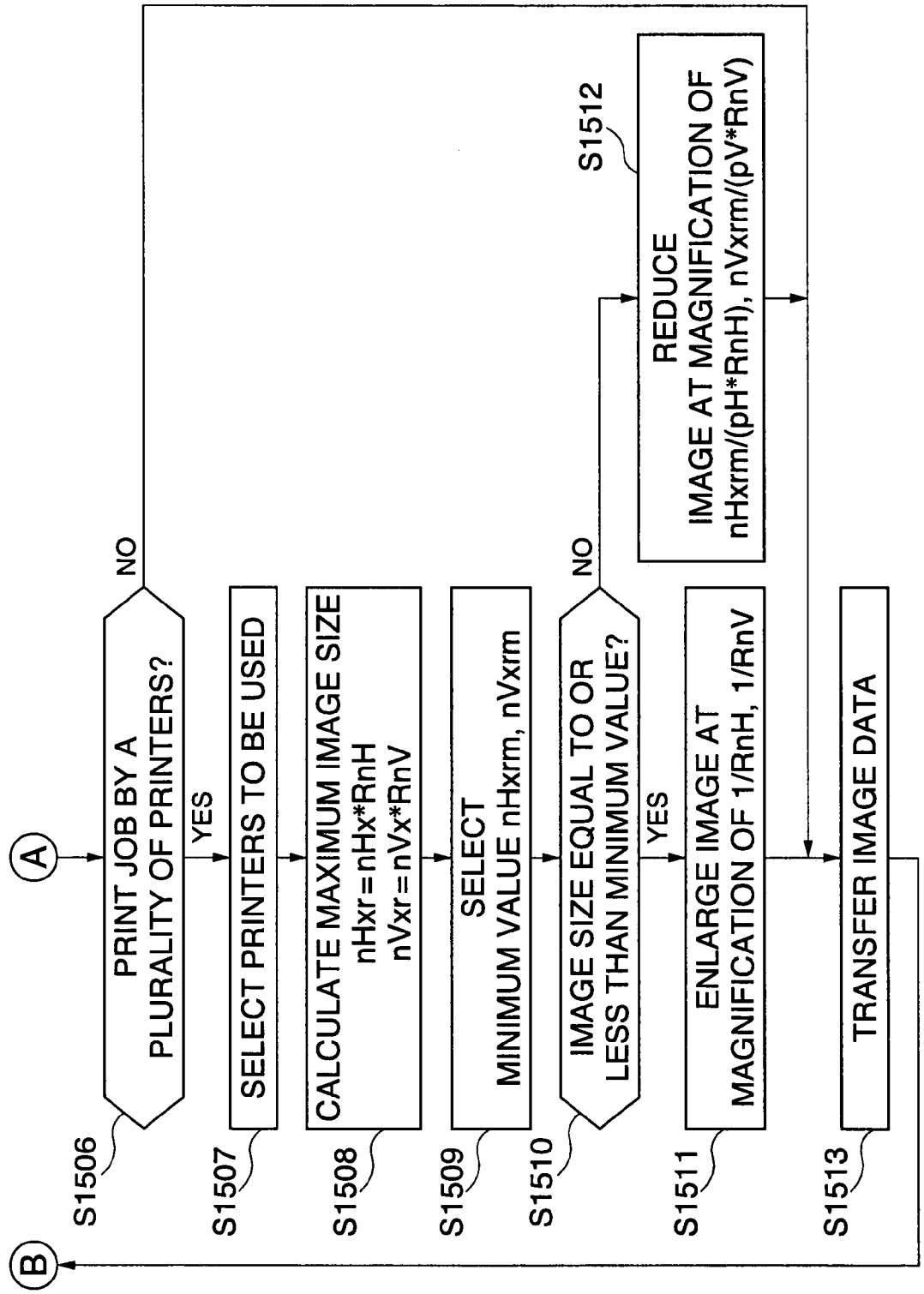

FIGS. 14A and 14B is a flow chart showing an image forming process carried out by the image forming system in FIG. 11, including processing for printing and reading mark images, and correcting the image size when printing original images based on integration data by each printer.

At a time point the master printer 1201 is connected to the slave printer 1202, the controller 1205 of the master printer 1201 communicates with the slave printer 1202, and acquires and stores information indicative of the maximum image size printable by printers including the master printer 1201 itself (step S1501). It is assumed here that the maximum image size in the main scanning direction and the maximum image size in the sub-scanning direction of the printer n (master printer 1201 or slave printer 1202) are designated by nHx and nVx, respectively.

The master printer 1201 instructs the respective printers including the master printer 1201 itself to execute a predetermined sequence (step S1502). In this predetermined sequence, each printer is instructed to print mark images on a transfer sheet by the same method as a printing method (full-color/black-and-white printing, double-sided/one-sided printing, and print speed) that should be adopted by the printer for printing of original images, and to read the mark images and calculate integration data upon the lapse of time required for the transfer sheet to return to its original size. In accordance with the instruction, the master printer 1201 and the slave printer 1202 execute the sequence (step S1503). In the following description, it is assumed that double-sided printing is performed. It should be noted that each printer calculates the distance between two printed mark images in the main scanning direction and the distance between two printed mark images in the sub-scanning direction, and on the basis of the calculation results, the printer n calculates a main scanning direction image reduction ratio RnH1 for the first side of a transfer sheet, a sub-scanning direction image reduction ratio RnV1 for the first side of the transfer sheet, a main scanning direction image reduction ratio RnH2 for the second side of the transfer sheet, and a sub-scanning direction image reduction ratio RnV2 for the second side of the transfer sheet.

The master printer 1201 collects the main scanning direction and sub-scanning direction image reduction ratios RnH1, RnV1, RnH2, and RnV2 for the first and second sides from the printers including the master printer 1201 itself, and stores them (step S1504).

Next, when a print job occurs in which transfer sheets printed by original image printing using a plurality of printers are bound up ("YES" in step S1505 and step S1506), the master printer 1201 selects printers (slave printers) suitable for the contents of the job on each page such as color/black-and-white, the number of pages to be printed, and so forth to be used (step S1507).

Then, the master printer 1201 calculates the final maximum image size which is finally reached by an image printed in the maximum printable image size in the printer n to be used when enough time has elapsed after fixing (step S1508). Specifically, the master printer 1201 calculates the final maximum image size $nHxr1=nHx \times RnH1$ in the main scanning direction and the final maximum image size $nVxr1=nVx \times RnV1$ in the sub-scanning direction on the first side of the transfer sheet, and the final maximum image size $nHxr2=nHx \times RnH2$ in the main scanning direction and the final maximum image size $nVxr2=nVx \times RnV2$ in the sub-scanning direction on the second side of the transfer sheet.

The minimum value in each of the main scanning direction and the sub-scanning direction is selected from all of the final maximum image sizes for the first and second sides in all the printers to be used, and the selected minimum value is regarded as nHxrm or nVxrm (step S1509).

Then, a main scanning direction image size pH and a sub-scanning direction image size pV transmitted as information attached to the print job are compared with the main scanning direction minimum value nHxrm and the sub-scanning direction minimum value nVxrm, respectively, among the final maximum image sizes (step S1510). If the transmitted image sizes pH, pV are equal to or less than the respective minimum values nHxrm, nVxrm ($pH \leq nHxrm$ and $pV \leq nVxrm$), the controller 1205 of the master printer 1201 enlarges the sizes of images to be printed by the printer n, for example, at a magnification of 1/RnH1 in the main scanning direction on the first side of a transfer sheet, at a magnification of 1/RnV1 in the sub-scanning direction on the first side, at a magnification of 1/RnH2 in the main scanning direction on the second side, and at a magnification of 1/RnV2 in the sub-scanning direction on the second side (step S1511), and then transfers them to the printer (step S1513). As a result, in any of the printers, the maximum image size becomes equal to the value pH in the main scanning direction and to the value pV in the sub-scanning direction on either the first or second side when enough time has elapsed after fixing.

On the other hand, if the transmitted image sizes pH, pV are greater than the respective minimum values nHxrm, nVxrm (pH>nHxrm and pV>nVxrm), the controller 1205 of the master printer 1201 enlarges the sizes of images to be printed by the printer n, for example, at a magnification of nHxrm/(pH×RnH1) in the main scanning direction on the first side of a transfer sheet, at a magnification of nVxrm/(pV×RnV1) in the sub-scanning direction on the first side, at a magnification of nHxrm/(pH×RnH2) in the main scanning direction on the second side, and at a magnification of nVxrm/(pV×RnV2) in the sub-scanning direction on the second side (step S1512), and then transfers them to the printer (step S1513). As a result, in any of the printers, the maximum image size becomes equal to the value nHxrm in the main scanning direction and to the value nVxrm in the sub-scanning direction on either the first or second side when enough time has elapsed after fixing.

In this way, it is possible to make uniform the sizes of images printed by all of the printers used.

In the above described first embodiment, the image forming system is comprised of the host server and the printers on the network, and the host server distributes images to the printers after adjusting the sizes thereof. On the other hand, in the second embodiment, the image forming system is comprised of the master printer and the slave printer, and the master printer distributes them to the master printer itself and the slave printers after adjusting the sizes of the images. The present invention, however, is not limited to these embodiments, but the present invention may be applied to any form insofar as it includes a distributing apparatus that distributes image data to a plurality of printers adjusts the sizes of images.

Further, it is to be understood that the object of the present invention may also be accomplished by supplying a system or an apparatus with a storage medium (or a recording medium) storing a program code of software which realizes the functions of any of the above described embodiments.

In this case, the program code itself realizes the novel functions of the present invention, and hence the program code and the storage medium on which the program code is stored constitute the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM.

Further, it is to be understood that the functions of any of the above described embodiments may be accomplished not only by executing a program code read out by a computer, but also by causing an OS (Operating System) or the like which operates on the computer to perform a part or all of the actual operations based on instructions of the program code.

Further, it is to be understood that the functions of any of the above described embodiments may be accomplished by writing a program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. An image forming system comprising:
   a plurality of image forming apparatuses;
   a distributing apparatus that distributes image data to said plurality of image forming apparatuses;
   a mark forming device provided in each of said plurality of image forming apparatuses, for forming at least one predetermined mark on a transfer material;
   a fixing device provided in each of said plurality of image forming apparatuses, for thermally fixing a toner image formed on the transfer material;
   a detecting device provided in each of said plurality of image forming apparatuses, for detecting the predetermined mark formed on the transfer material; and
   a transfer device provided in said distributing apparatus, for adjusting sizes of images to be formed by respective ones of said plurality of image forming apparatuses according to the predetermined mark detected by the respective ones of said plurality of image forming apparatuses, and for transferring the images to the respective ones of said plurality of image forming apparatuses.

2. An image forming system according to claim 1, comprising a reduction ratio calculating device that calculates reduction ratios of transfer materials used by respective ones of said plurality of image forming apparatuses according to the predetermined mark detected by the respective ones of said plurality of image forming apparatuses; and
   wherein said transfer device selects a minimum value among the reduction ratios calculated by said reduction ratio calculating device and corresponding to the respective ones of said plurality of image forming apparatuses, and adjusts sizes of images to be formed by the respective ones of said plurality of image forming apparatuses according to the selected minimum value.

3. An image forming system according to claim 2, wherein said reduction ratio calculating device is provided in each of said plurality of image forming apparatuses.

4. An image forming system according to claim 2, wherein said reduction ratio calculating device is provided in said distributing apparatus.

5. An image forming system according to claim 1, wherein said detecting device detects the predetermined mark formed on the transfer material at least after a temperature of the transfer material becomes equal to an ambient temperature after said fixing device thermally fixes the toner image of the predetermined mark formed on the transfer material.

6. An image forming system according to claim 1, wherein said transfer device adjusts the sizes of images to be formed by the respective ones of said plurality of image forming apparatuses according to the predetermined mark detected by the respective ones of said plurality of image forming apparatuses and an order in which the predetermined mark is formed in a case where the predetermined mark is formed on both sides of the transfer material.

7. An image forming apparatus according to claim 1, wherein said mark forming device forms a plurality of predetermined marks as the predetermined mark on the transfer material in a manner being arranged in a main scanning direction thereof, and detects the plurality of predetermined marks at a time.

8. An image forming apparatus according to claim 1, wherein said mark forming device forms a plurality of predetermined marks as the predetermined mark on the transfer material in a manner being arranged in a sub-scanning direction thereof, and detects the plurality of predetermined marks at different times.

9. An image forming apparatus according to claim 1, wherein said distributing apparatus is included one of said plurality of image forming apparatuses.

10. An image distribution apparatus for distributing image data to a plurality of image forming apparatuses connected to the image distribution apparatus, the image forming apparatuses each comprising a mark forming device that forms at least one predetermined mark on a transfer material, a fixing device that thermally fixes a toner image formed on the transfer material, and a detecting device that detects the predetermined mark formed on the transfer material, the image distribution apparatus comprising:

a transfer device that adjusts sizes of images to be formed by respective ones of the plurality of image forming apparatuses according to the predetermined mark detected by the detecting devices of the respective ones of the plurality of image forming apparatuses, and transfers the images to the respective ones of the plurality of image forming apparatuses.

11. An image distribution apparatus according to claim 10, comprising a reduction ratio calculating device that calculates reduction ratios of transfer materials to be used by respective ones of the plurality of image forming apparatuses according to the predetermined mark detected by the respective ones of the plurality of image forming apparatuses; and wherein said transfer device selects a minimum value among the reduction ratios calculated by said reduction ratio calculating device and corresponding to the respective ones of the image forming apparatuses, and adjusts sizes of images to be formed by the respective ones of the plurality of image forming apparatuses according to the selected minimum value.

12. An image distribution apparatus according to claim 10, wherein said transfer device adjusts the sizes of images to be formed by the respective ones of the plurality of image forming apparatuses according to the predetermined mark detected by respective ones of the plurality of image forming apparatuses, and an order in which the predetermined mark is formed in a case where the predetermined mark is formed on both sides of the transfer material.

13. An image distribution apparatus according to claim 10, which is included in one of the plurality of image forming apparatuses.

14. An image forming method executed by an image forming system comprising a plurality of image forming apparatuses and a distributing apparatus that distributes image data to the plurality of image forming apparatuses, comprising the steps of:

a mark forming step of causing each of the plurality of image forming apparatuses to form at least one predetermined mark on a transfer material;

a fixing step of causing each of the plurality of image forming apparatuses to thermally fix a toner image formed on the transfer material;

a detecting step of causing each of the plurality of image forming apparatuses to detect the predetermined mark formed and thermally fixed on the transfer material; and a transfer step of causing the distributing apparatus to adjust sizes of images to be formed by respective ones of the plurality of image forming apparatuses according to the predetermined mark detected by the respective ones of the plurality of image forming apparatuses, and transfer the images to the plurality of image forming apparatuses.

15. An image forming method according to claim 14, comprising a reduction ratio calculating step of calculating reduction ratios of transfer materials used by respective ones of the plurality of image forming apparatuses according to the predetermined mark detected by the respective ones of the plurality of image forming apparatuses; and wherein said transfer step comprises selecting a minimum value among the calculated reduction ratios and corresponding to the respective ones of the plurality of image forming apparatuses in said reduction ratio calculating step, and adjusting sizes of images to be formed by respective ones of the plurality of image forming apparatuses according to the selected minimum value.

16. An image forming method according to claim 15, wherein said reduction ratio calculating step is executed by each of the plurality of image forming apparatuses.

17. An image forming method according to claim 15, wherein said reduction ratio calculating step is executed by the distributing apparatus.

18. An image forming method according to claim 14, wherein said detecting step comprises detecting the predetermined mark formed on the transfer material at least after a temperature of the transfer material becomes equal to an ambient temperature after the toner image of the predetermined mark formed on the transfer material is thermally fixed in said fixing step.

19. An image forming method according to claim 14, wherein said transfer step comprises adjusting the sizes of images to be formed by the respective ones of the plurality of image forming apparatuses according to the predetermined mark detected by respective ones of the plurality of image forming apparatuses and an order in which the predetermined mark is formed in a case where the predetermined mark is formed on both sides of the transfer material.

20. An image forming method according to claim 14, wherein said mark forming step comprises forming a plurality of predetermined marks as the predetermined mark on the transfer material in a manner being arranged in a main scanning direction thereof, and said detecting step comprises detecting the plurality of predetermined marks at a time.

21. An image forming method according to claim 14, wherein said mark forming step comprises forming a plurality of predetermined marks as the predetermined mark on the transfer material in a manner being arranged in a sub-scanning direction thereof, and said detecting step comprises detecting the plurality of predetermined marks at different times.

* * * * *